(12) United States Patent
Kouri

(10) Patent No.: US 10,730,190 B2
(45) Date of Patent: *Aug. 4, 2020

(54) SIDE-LOADING ROBOTIC ARM FOR FRONT-END LOADING VEHICLES

(71) Applicant: Anthony Stephen Kouri, Breckenridge, TX (US)

(72) Inventor: Anthony Stephen Kouri, Breckenridge, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/235,343

(22) Filed: Dec. 28, 2018

(65) Prior Publication Data

US 2019/0202068 A1    Jul. 4, 2019

Related U.S. Application Data

(60) Provisional application No. 62/611,147, filed on Dec. 28, 2017.

(51) Int. Cl.
| | |
|---|---|
| *B25J 15/00* | (2006.01) |
| *B25J 15/02* | (2006.01) |
| *B25J 18/04* | (2006.01) |
| *B25J 5/00* | (2006.01) |
| *B65F 3/04* | (2006.01) |
| *B25J 11/00* | (2006.01) |

(52) U.S. Cl.
CPC ............ *B25J 15/0014* (2013.01); *B25J 5/00* (2013.01); *B25J 11/008* (2013.01); *B25J 15/0213* (2013.01); *B25J 18/04* (2013.01); *B65F 3/04* (2013.01)

(58) Field of Classification Search
CPC ....... B25J 5/00; B65F 3/04; B66F 9/18; B66F 9/186; B66F 9/187
USPC .......................................... 414/403–410, 724
See application file for complete search history.

(56) References Cited

U.S. PATENT DOCUMENTS

| | | |
|---|---|---|
| 4,773,812 A | 9/1988 | Bayne et al. |
| 5,308,211 A | 5/1994 | Bayne |
| 5,333,984 A | 8/1994 | Bayne et al. |
| 5,797,715 A * | 8/1998 | Christenson ............ B65F 3/001 220/1.5 |
| 5,898,378 A * | 4/1999 | Berg ....................... B66F 9/187 340/679 |
| 6,357,988 B1 | 3/2002 | Bayne |
| 6,644,906 B2 | 11/2003 | Bayne |
| 7,210,890 B2 | 5/2007 | Curotto et al. |
| 7,553,121 B2 | 6/2009 | Curotto et al. |
| 7,845,893 B2 | 12/2010 | Tucker |
| 7,927,060 B2 | 4/2011 | Biggerstaff et al. |
| 8,092,141 B2 | 1/2012 | Curotto et al. |

(Continued)

*Primary Examiner* — Ronald P Jarrett
(74) *Attorney, Agent, or Firm* — Kelly & Kelley, LLP

(57) ABSTRACT

A side-loading robotic arm for use with front-end loaders. The robotic arm is configured to separately and independently attach to the forks of the front-end loader, relative to a liftable container. With this configuration, the robotic arm is useable with any type of liftable container that might be useable with the front-end loader. The robotic arm includes a tip arm that is pivotable between a stowed position and an operational position. The stowed position stores the tip arm and gripper arms inside a vertical plane of the lifting forks of the front-end loader. The operational position extends the tip arm and gripper arms outside of the vertical plane of the major lifting arms of the front-end loader.

19 Claims, 25 Drawing Sheets

(56) References Cited

U.S. PATENT DOCUMENTS

| | | |
|---|---|---|
| 8,425,177 B2 | 4/2013 | Tucker |
| 8,496,427 B2 | 7/2013 | Curotto et al. |
| 8,556,117 B2 | 10/2013 | Curotto |
| 8,979,142 B2 | 3/2015 | Curotto |
| 9,278,805 B2 | 3/2016 | Curotto |
| 9,399,549 B2 | 7/2016 | Curotto et al. |
| 9,511,932 B2 | 12/2016 | Curotto et al. |
| D799,304 S | 10/2017 | Fraas et al. |
| D806,903 S | 1/2018 | Fraas |
| 2004/0184902 A1 | 9/2004 | Bayne et al. |
| 2006/0045681 A1 | 3/2006 | Bayne et al. |
| 2014/0193235 A1* | 7/2014 | Kennedy ................ B65H 49/38 414/812 |

* cited by examiner

SIDE-LOADING ROBOTIC ARM FOR FRONT-END LOADING VEHICLES

RELATED APPLICATION

This application claims the benefit of U.S. Provisional Application No. 62/611,147, filed on Dec. 28, 2017.

BACKGROUND OF THE INVENTION

The present invention is directed to robotic arm mechanism for front-end loaders. More particularly, the invention is directed to a side-loading robotic arm compatible for use with a liftable container on the front-end loader.

Conventional side-loading robotic arms are typically integral with or otherwise attached to the liftable containers with which they are intended to be used. Such integral or attached construction of the robotic arm to the liftable container presents certain drawbacks. When using a combined robotic arm and liftable container, the front-end loader is incapable of being easily used with any other liftable containers. Because the robotic arm portion of the combination requires connected hydraulic, electrical, and/or other control interfaces, a driver must exit the vehicle to disconnect such control interfaces prior to removing a combined robotic arm and liftable container from the forks of the front-end loader. Only after the combined robotic arm and liftable container is removed from the forks of the front-end loader can the front-end loader be used to lift a different liftable container.

In addition, the combined robotic arm and liftable container cannot easily be used with a different front-end loader. Because front-end loaders have different designs and configurations, a driver must always be concerned that a robotic arm attached to a liftable container has clearance throughout the entire lifting arc of the forks on a front-end loader relative to the vehicle. Thus, a combined robotic arm and liftable container is not necessarily compatible with the forks of every front-end loader. There is always a concern that a combined robotic arm and liftable container will follow a path that intersects with the vehicle when used on a front-end loader of a different design or configuration, whether the robotic arm is connected to a control interface or not.

Furthermore, a combined robotic arm and liftable container is limited in its use to only the liftable container of the combination. Sometimes, it is advantageous for a driver to be able to use a different container with a robotic arm, i.e., a larger container or a container of a different shape. A driver may find this to be an advantage when using a front-end loader in a particular area, such as a commercial facility that has its own liftable containers configured for their special needs or when switching from types of waste, i.e., garbage, recyclables, yard waste, etc.

Accordingly, there is a need for an improved side-loading robotic arm that is capable of being used with a front-end loader, while not being combined with or attached to a liftable container, permits use with different liftable containers on the same front-end loader, and allows for easily switching of liftable containers without the need for a driver to exit the vehicle and disconnect a control interface in order to switch liftable containers. The present invention fulfills these needs and provides other related advantages.

SUMMARY OF THE INVENTION

The present invention is directed to a side-loading robotic arm for front-end loaders. The side-loading robotic arm includes a pair of lateral rails disposed in parallel and joined at opposite ends by a pair of fork channels. A base motor is attached to one end of the pair of lateral rails. A carriage body is slidingly disposed on the pair of lateral rails and operationally connected to the base motor. A raising arm is pivotingly attached at one end to the carriage body and a tip arm is pivotingly attached to the raising arm opposite the carriage body. The tip arm is pivotable between a vertical stowed position and a horizontal operational position. A pair of gripper arms is attached to the tip arm.

The fork channels are preferably configured to slidingly receive forks from a front-end loader and further include locking screws configured to secure the forks within the fork channels. The carriage body is operationally connected to the base motor by a reciprocating device configured to move the carriage body back and forth along the pair of lateral rails.

A lift cylinder is operationally connected at one end to the carriage body and at an opposite end to the raising arm. Similarly, a tip cylinder is operationally connected at one end to the tip arm and at an opposite end to the raising arm. The tip arm preferably includes an attachment portion and an offset portion, each perpendicularly connected to the other. The attachment portion is connected at one end to the raising arm and at an opposite end to the offset portion. The offset portion is connected at one end to the attachment portion, and the gripper arms are attached to the offset portion at a mid-point or an opposite end relative to the attachment portion.

The horizontal operational position disposes the pair of gripper arms wider than the pair of fork channels because of the configuration of the attachment portion. The vertical stowed position disposes the tip arm inside an outer edge of one of the pair of fork channels.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
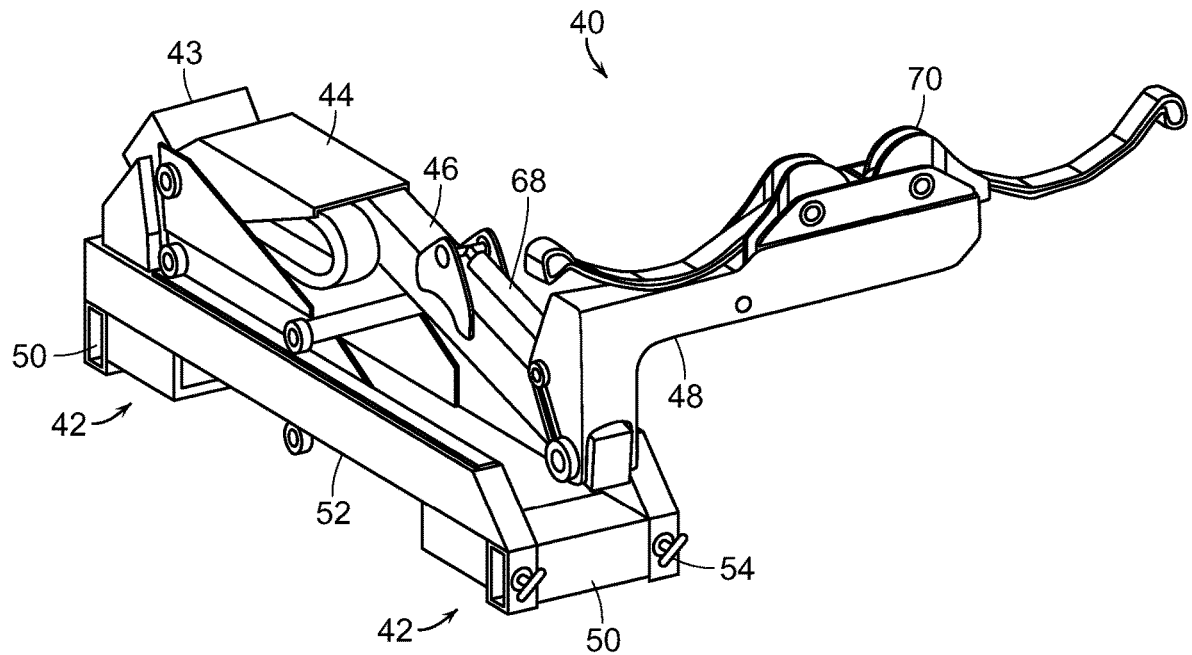
FIG. 1 is a perspective view of the side-loading robotic arm of the present invention.
Figure 2:
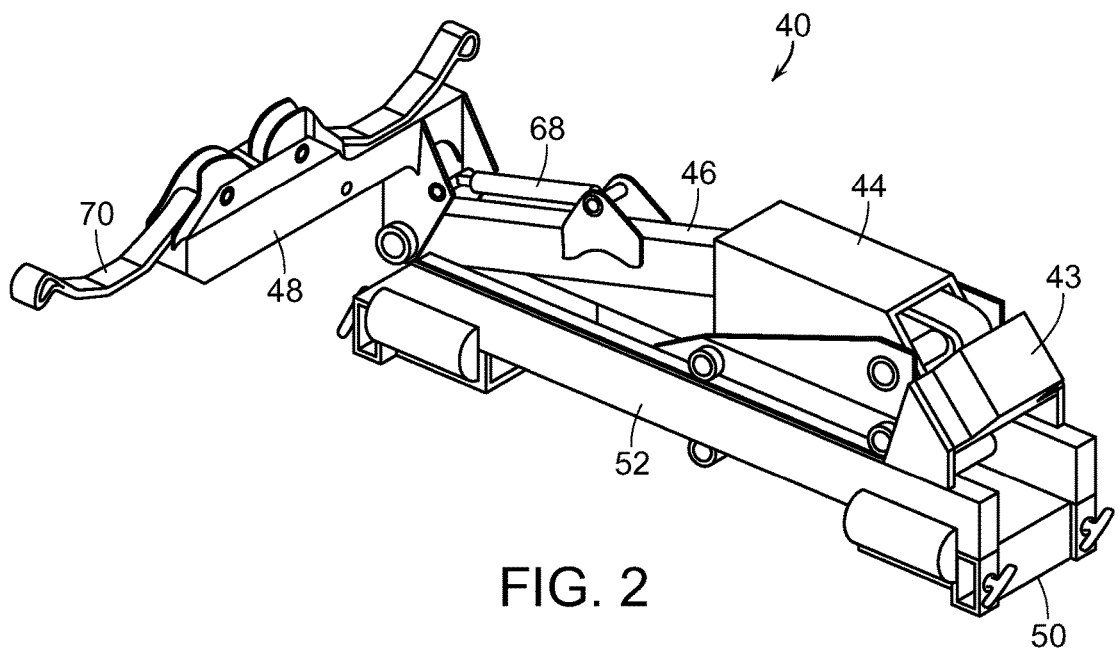
FIG. 2 is a perspective view from the opposite side of FIG. 1 of the side-loading robotic arm of the present invention.
Figure 3:
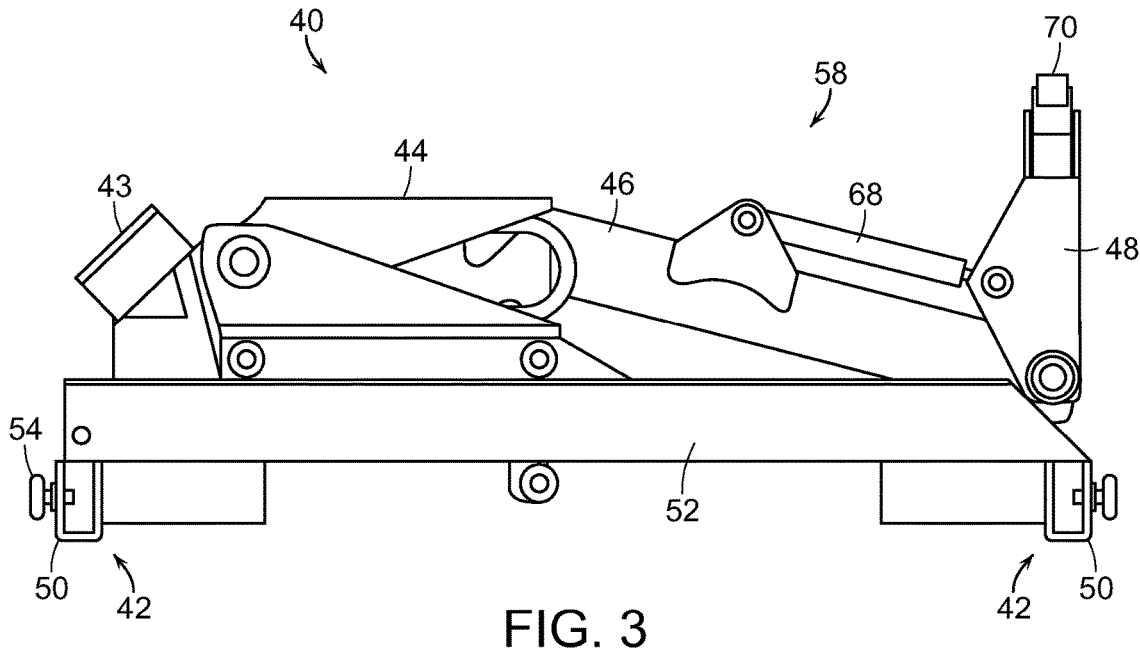
FIG. 3 is a rear view of the side-loading robotic arm of the present invention.
Figure 4:
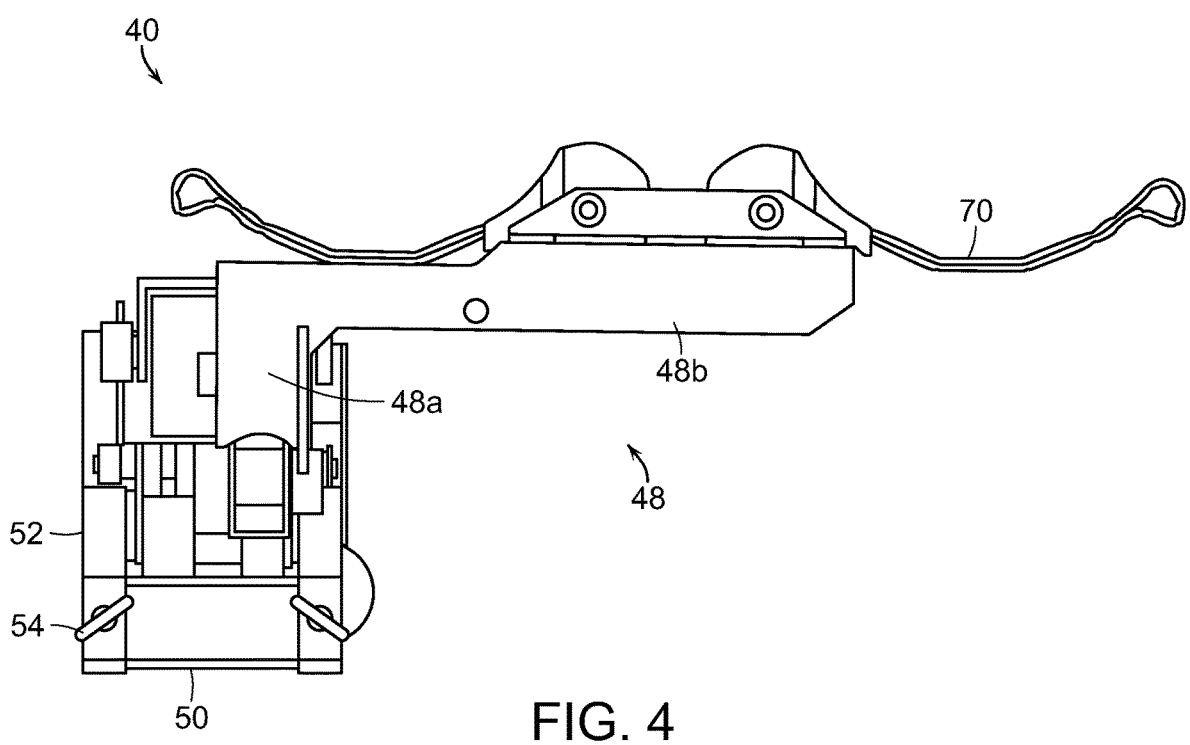
FIG. 4 is a right-side view of the side-loading robotic arm of the present invention.
Figure 5:
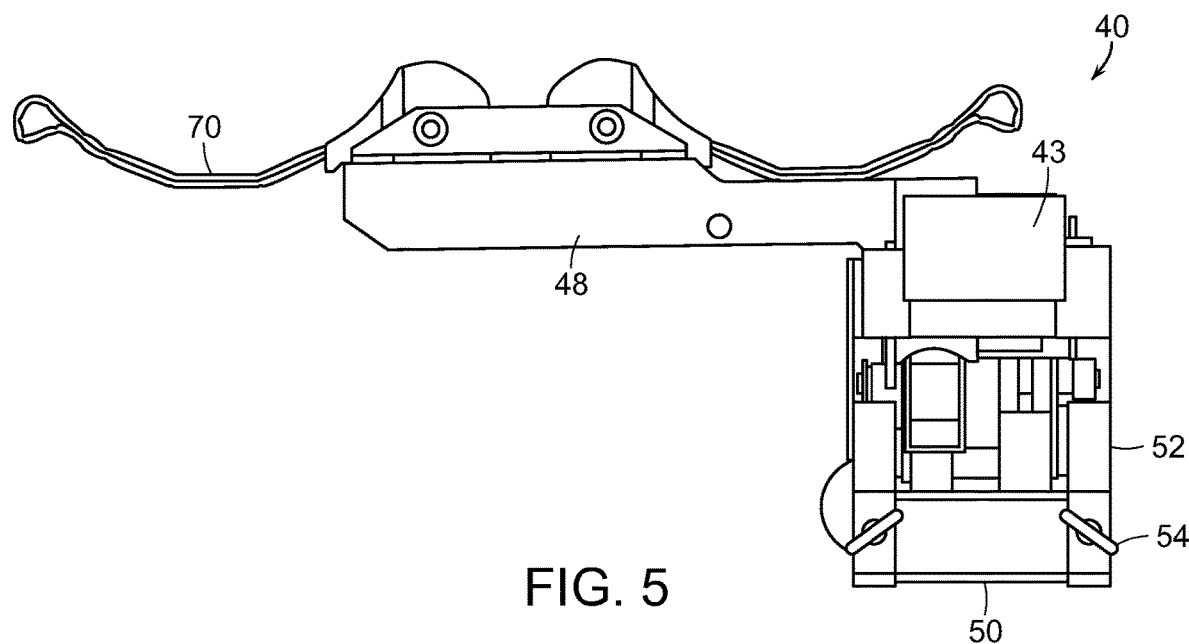
FIG. 5 is a left-side view of the side-loading robotic arm of the present invention.
Figure 6:
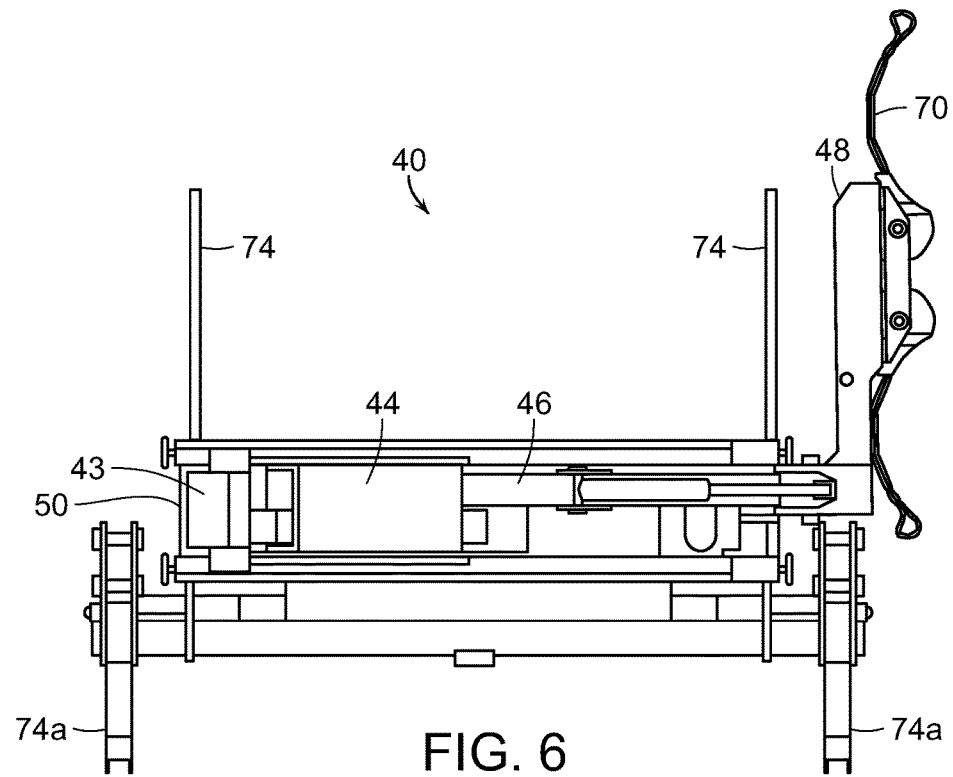
FIG. 6 is another perspective view of the side-loading robotic arm of the present invention.

In the following detailed description, the side-loading robotic arm of the present invention is generally referred to by reference numeral 40 in FIGS. 1-5. The primary components of the side-loading robotic arm 40 include fork clamps 42, a base motor 43, a lateral carriage body 44, a raising arm 46 and a tip arm 48.

The fork clamps 42 include a pair of channels 50, each configured to receive one of a pair of forks as from a front-end loader (see below). The pair of channels 50 are disposed a distance apart from each other and joined together by a pair of lateral rails 52. The junctions between the channels 50 and rails 52 are preferably reinforced to sustain forces typically encountered in collection operations as described below. The distance between the pair of channels 50 is approximately equal to the distance between forks on a typical front-end loader. To the extent the distance between forks on a front-end loader may be adjusted larger or smaller, the distance between the pair of channels 50 may be constructed to be larger or smaller, or adjustable, wherein one or both of the channels 50 may be slidably adjustable on the lateral rails 52. The channels 50 each preferably include locking pins or screws 54 (or similar mechanisms) for securing the channels 50 to the forks when inserted as described below.

The base motor 43 is fixed at one end of the lateral rails 52 and works in conjunction with the lateral carriage body 44 that is slidably mounted on the lateral rails 52 in a reciprocating manner, as by rollers or gears. The lateral carriage body 44 is preferably moveable along the length of the lateral rails 52 from the base motor 43 to an opposite end of the rails 52. The base motor 43 and lateral carriage body 44 are preferably operably connected by a reciprocating device such as a chain 56 or similar mechanism designed to reciprocatingly move the carriage body 44 along the rails 52.

Figure 25:
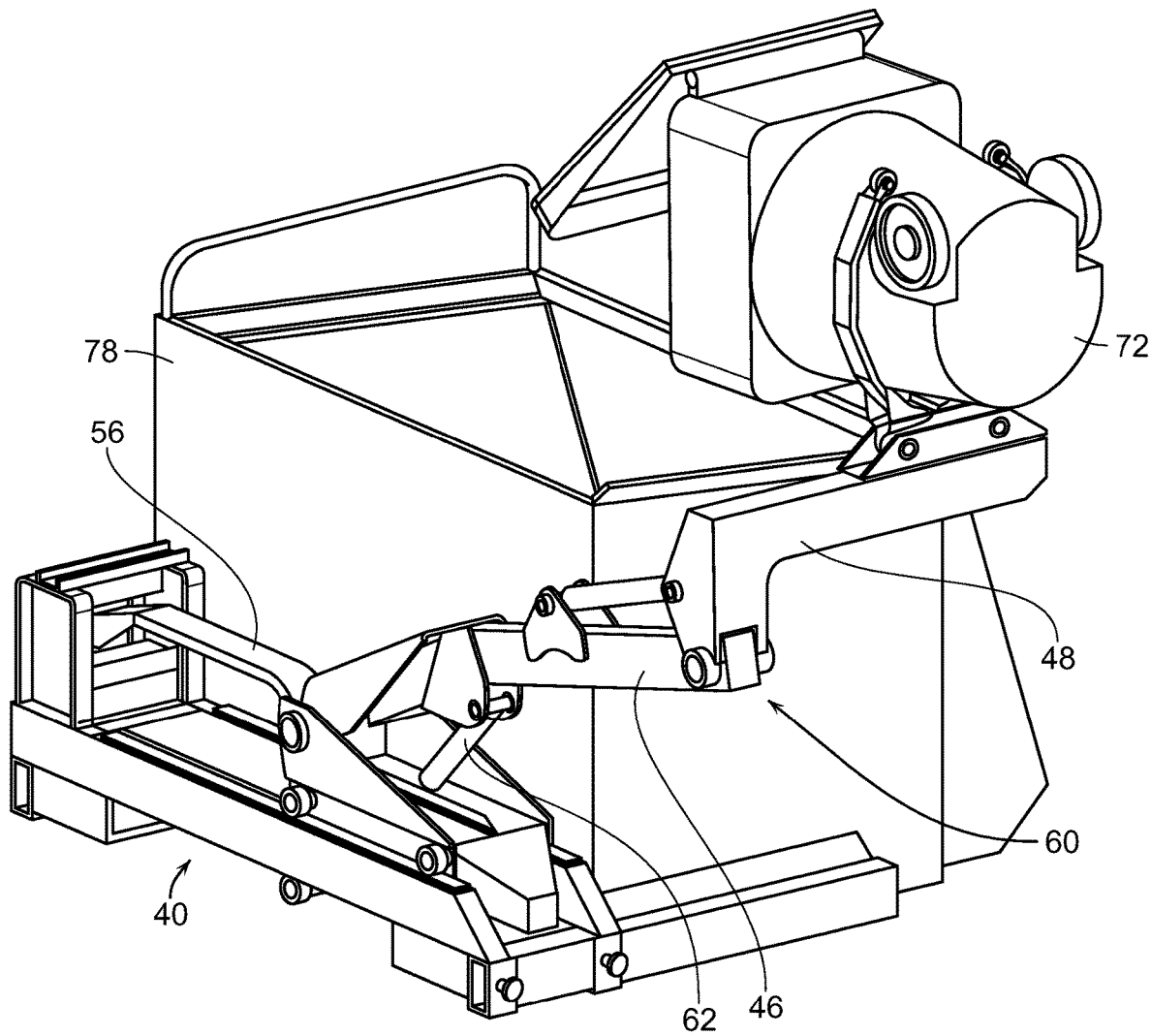
FIG. 25 is a perspective view of the side-loading robotic arm of the present invention paired with a liftable container, showing the robotic arm dumping a cart in the liftable container from an extended position.

The raising arm 46 is pivotally mounted on the lateral carriage body 44 so as to be movable between a default lowered position 58 and an operational high position 60 (FIGS. 25-32). The raising arm 46 is preferably operated by hydraulic or pneumatic controls through a lift cylinder 62 (FIG. 25).

Figure 7:
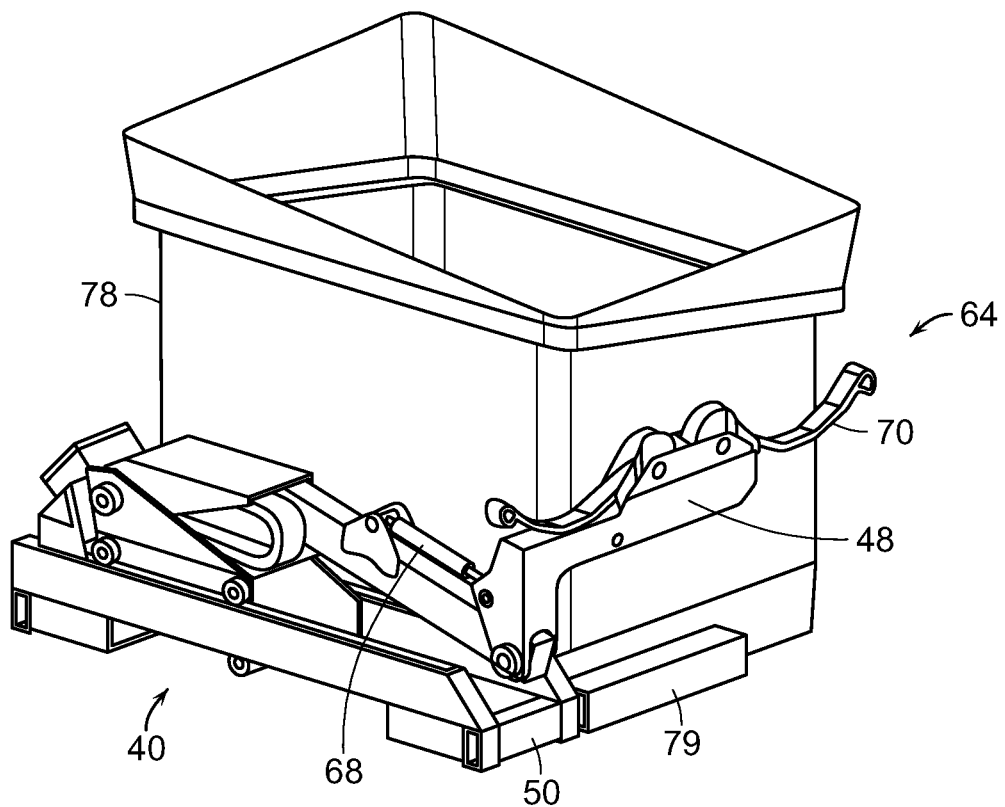
FIG. 7 is a perspective view of the side-loading robotic arm of the present invention paired with a liftable container, showing the clamp mechanism in a stowed position.
Figure 8:
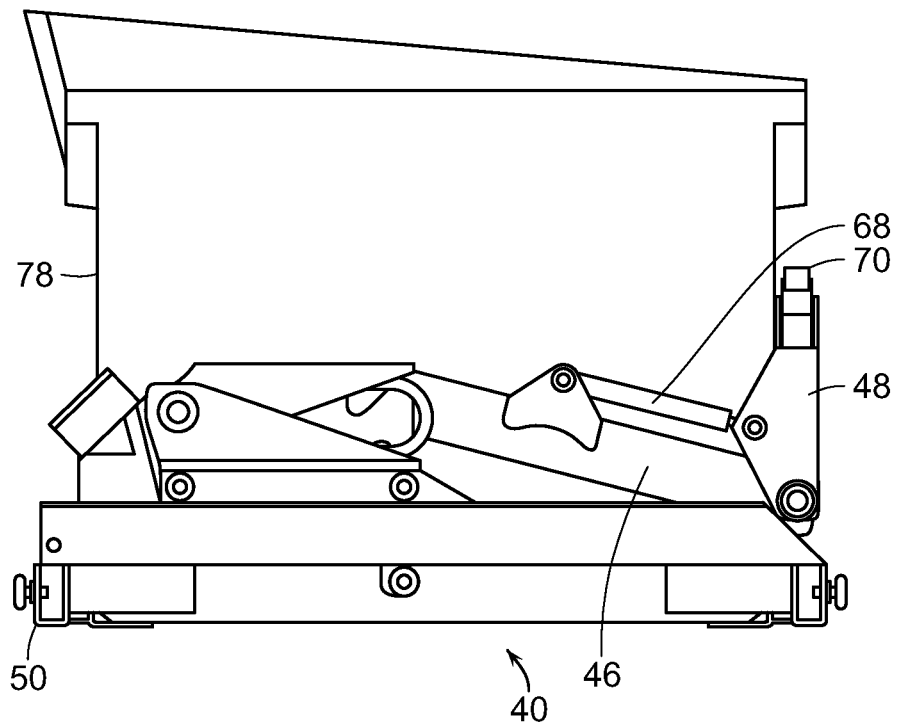
FIG. 8 is a rear view of the side-loading robotic arm of the present invention paired with a liftable container.
Figure 9:
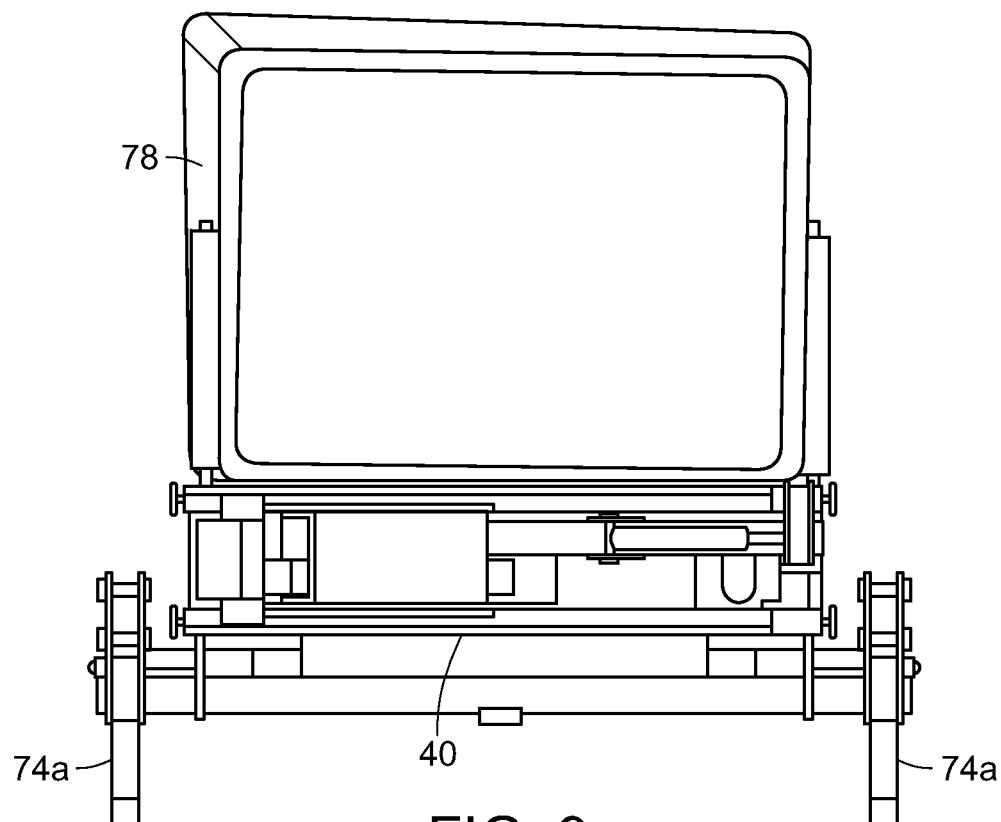
FIG. 9 is a top view of the side-loading robotic arm of the present invention paired with a liftable container on the forks of a front-end loader, showing the clamp mechanism in a stowed position.
Figure 10:
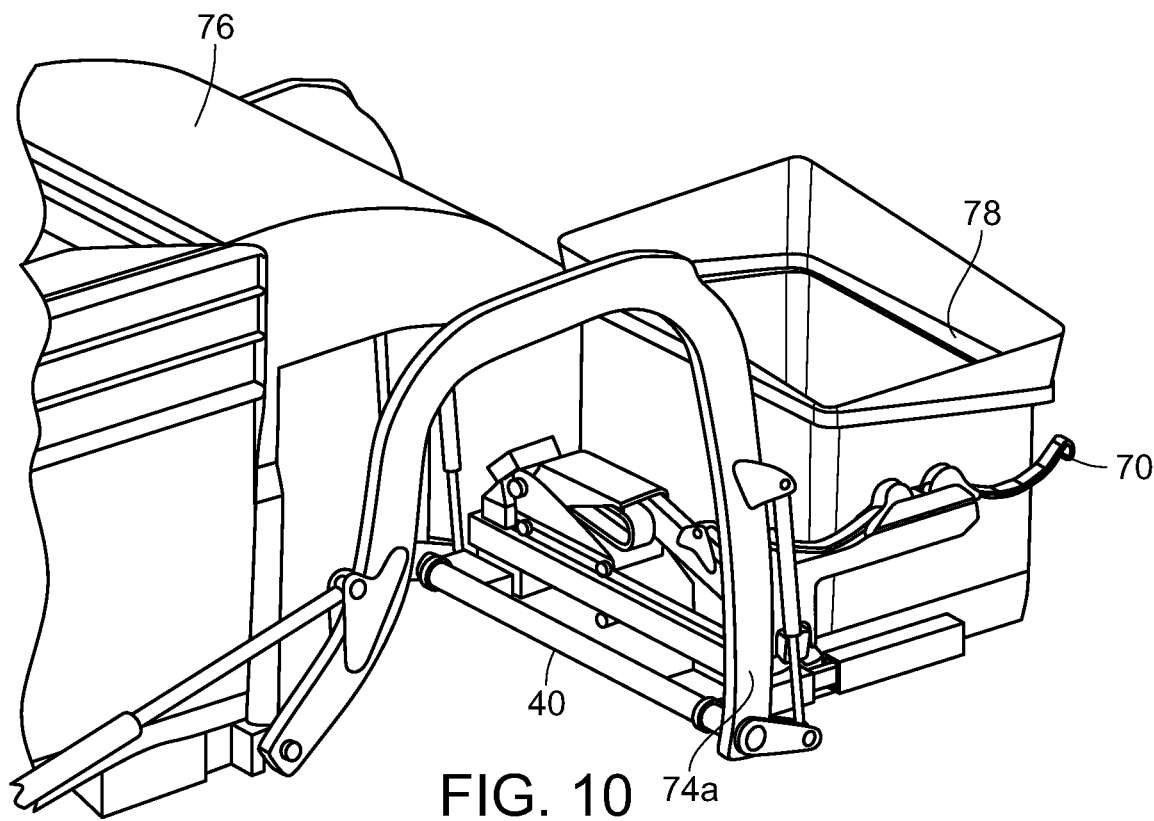
FIG. 10 is a perspective view of the side-loading robotic arm of the present invention mounted in the forks of a front-end loader and paired with a liftable container.
Figure 11:
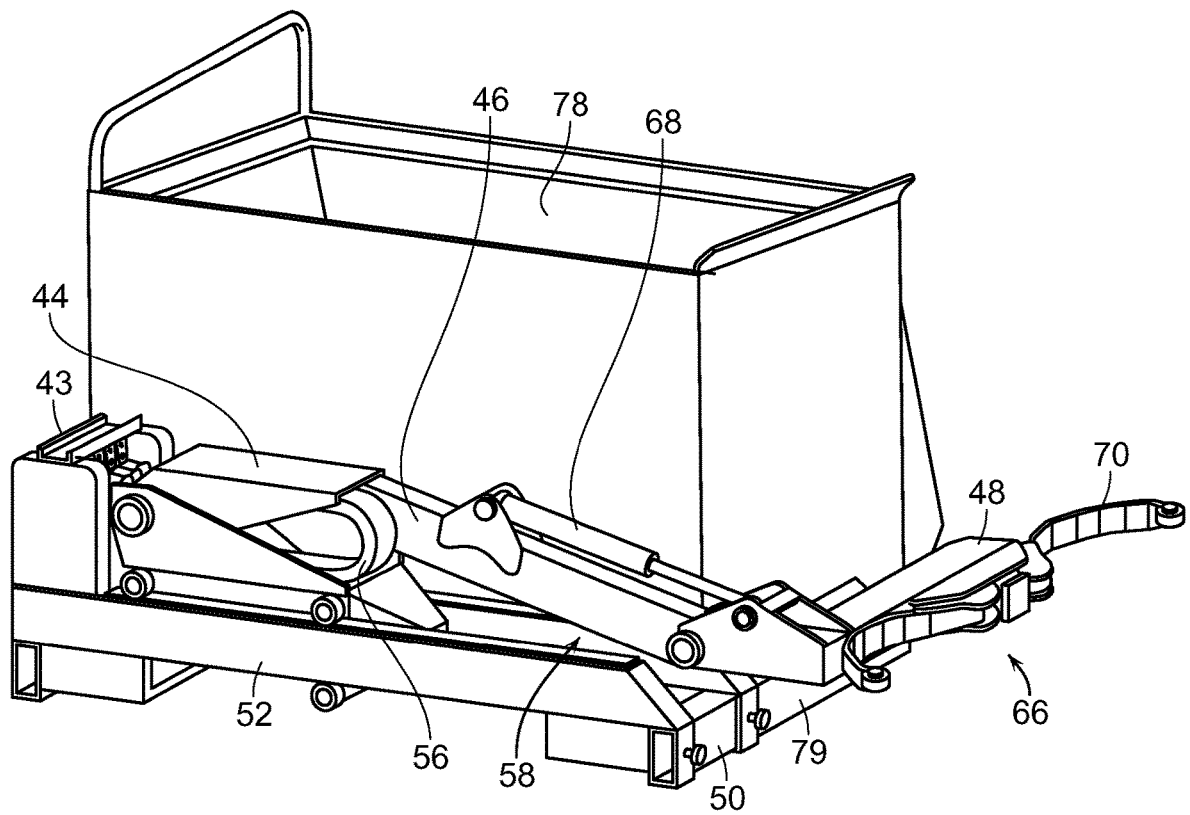
FIG. 11 is a perspective view of the side-loading robotic arm of the present invention paired with a liftable container, showing the clamp mechanism in a lowered position.
Figure 12:
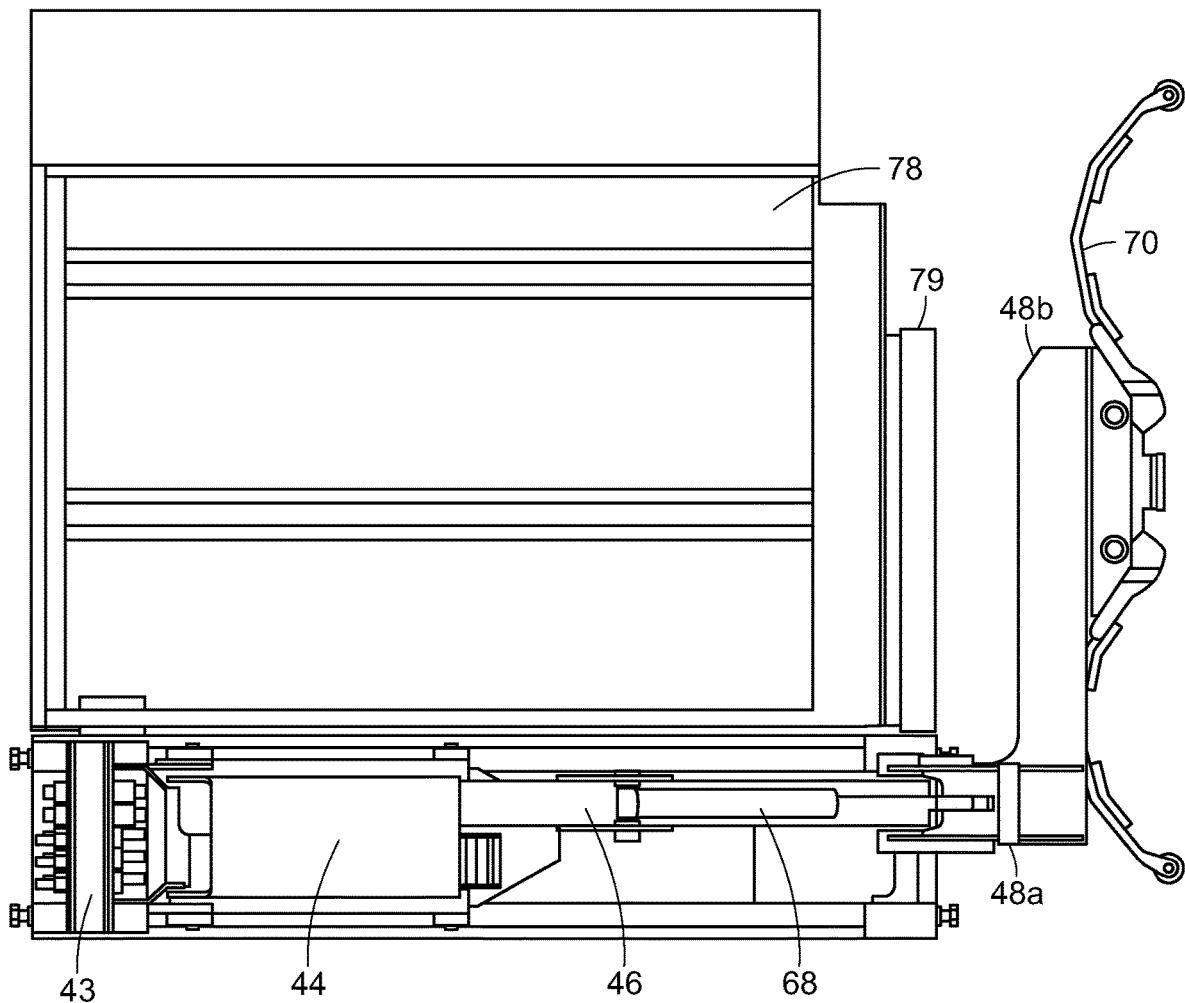
FIG. 12 is a top view of the side-loading robotic arm of the present invention paired with a liftable container, showing the clamp mechanism in a lowered position.
Figure 13:
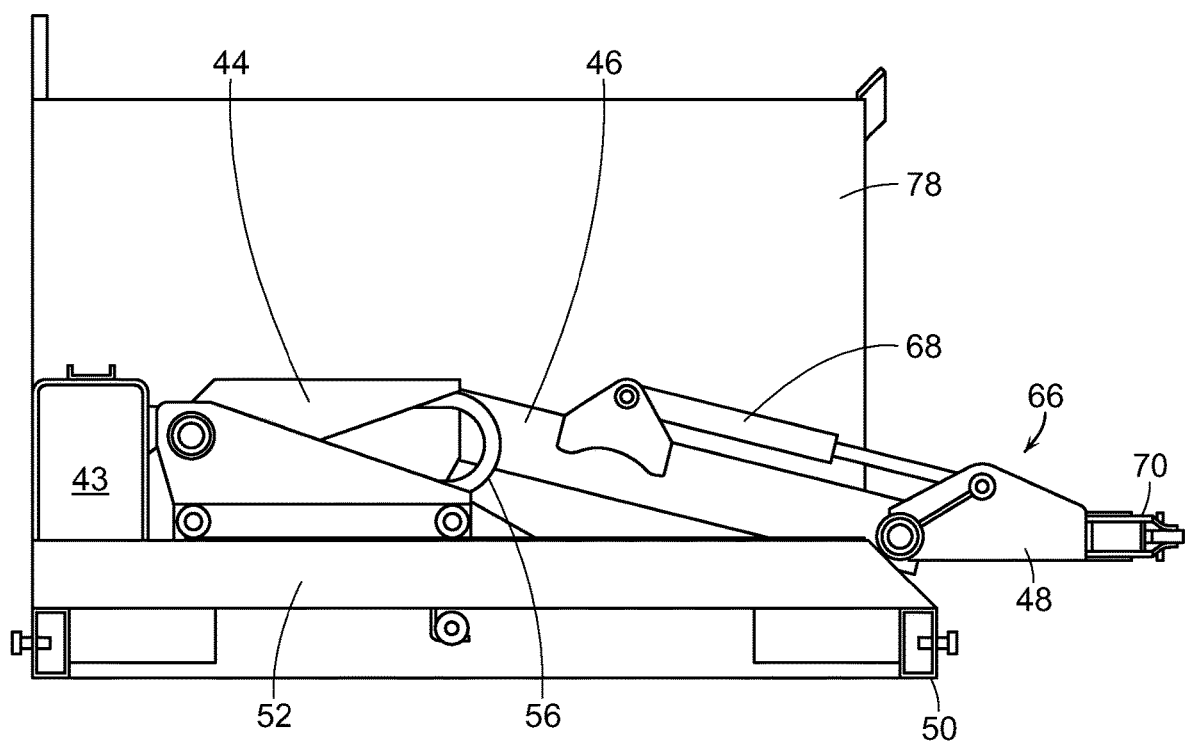
FIG. 13 is a rear view of the side-loading robotic arm of the present invention paired with a liftable container, showing the clamp mechanism in a lowered position.
Figure 14:
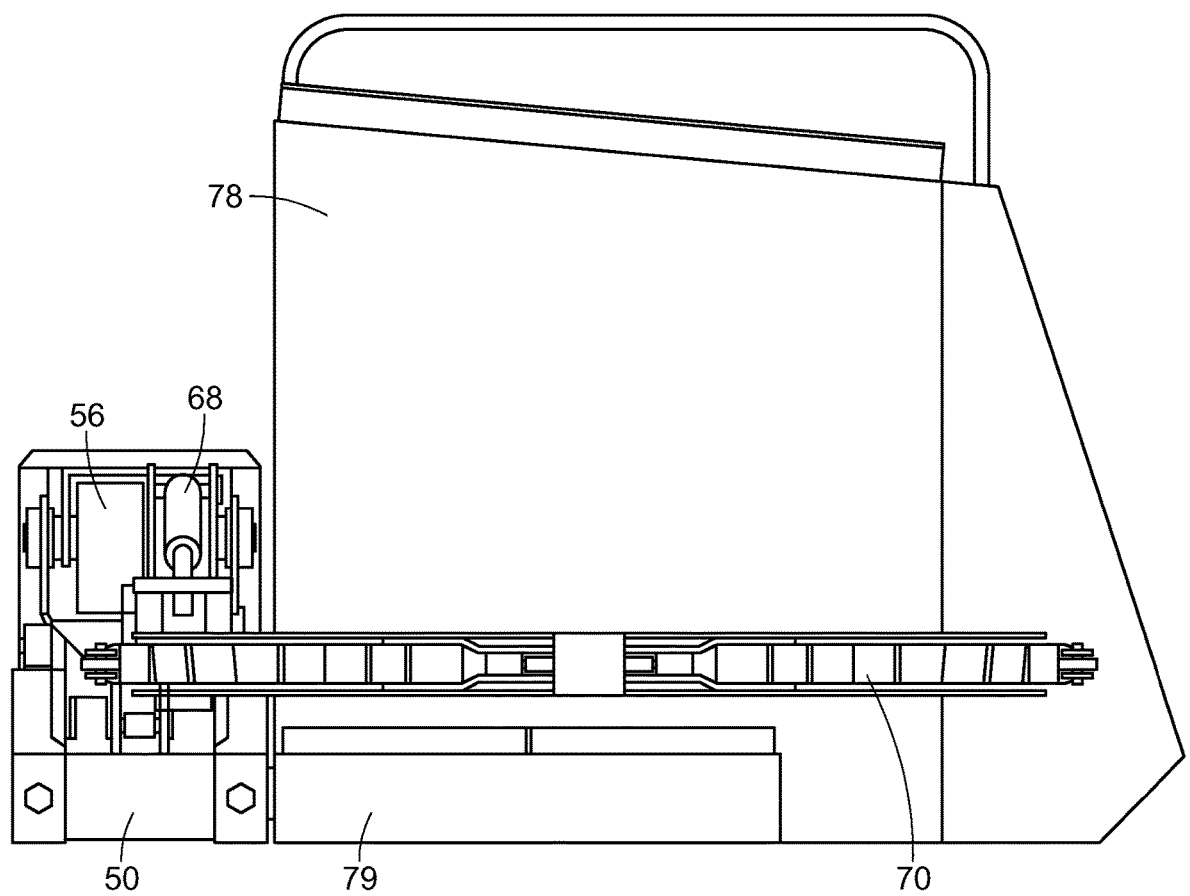
FIG. 14 is a right-side view of the side-loading robotic arm of the present invention paired with a liftable container, showing the clamp mechanism in a lowered position.
Figure 15:
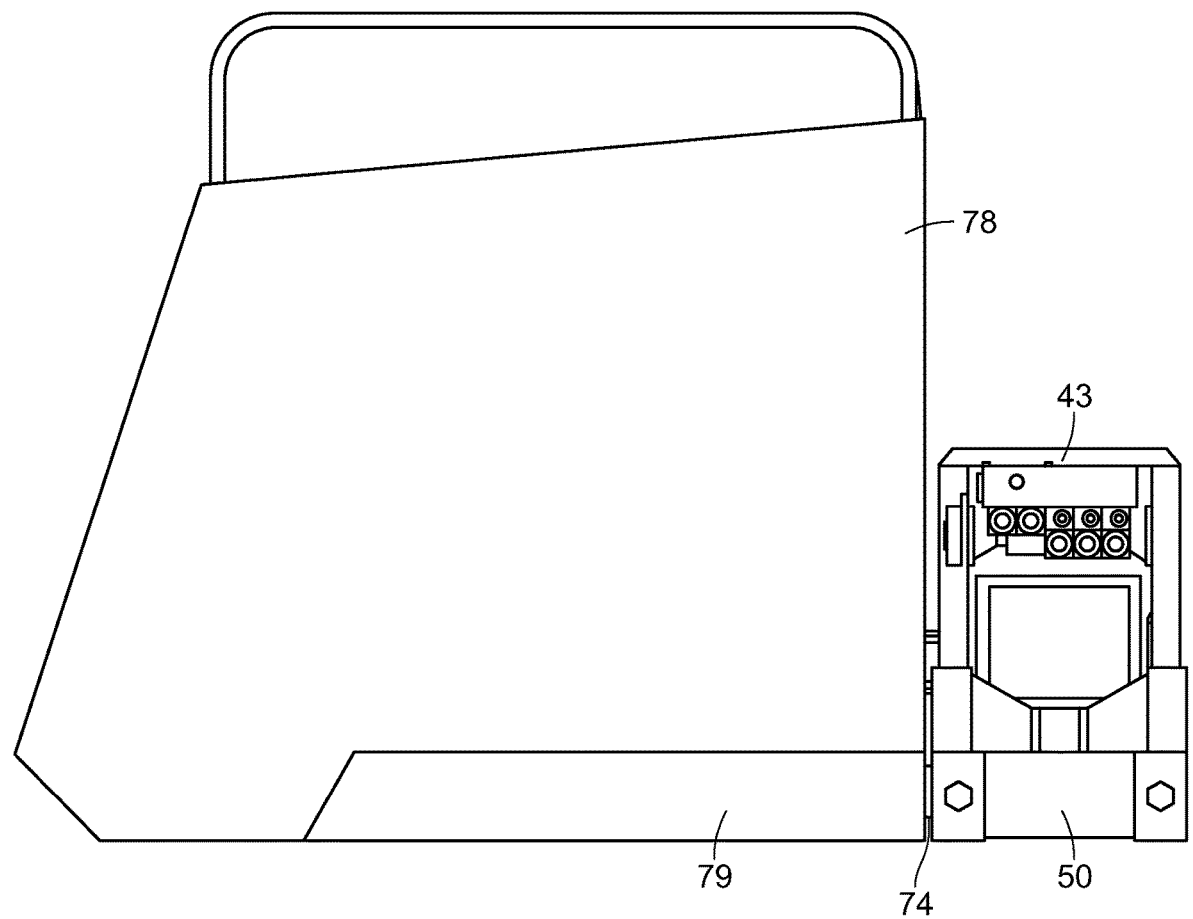
FIG. 15 is a left-side view of the side-loading robotic arm of the present invention paired with a liftable container.
Figure 16:
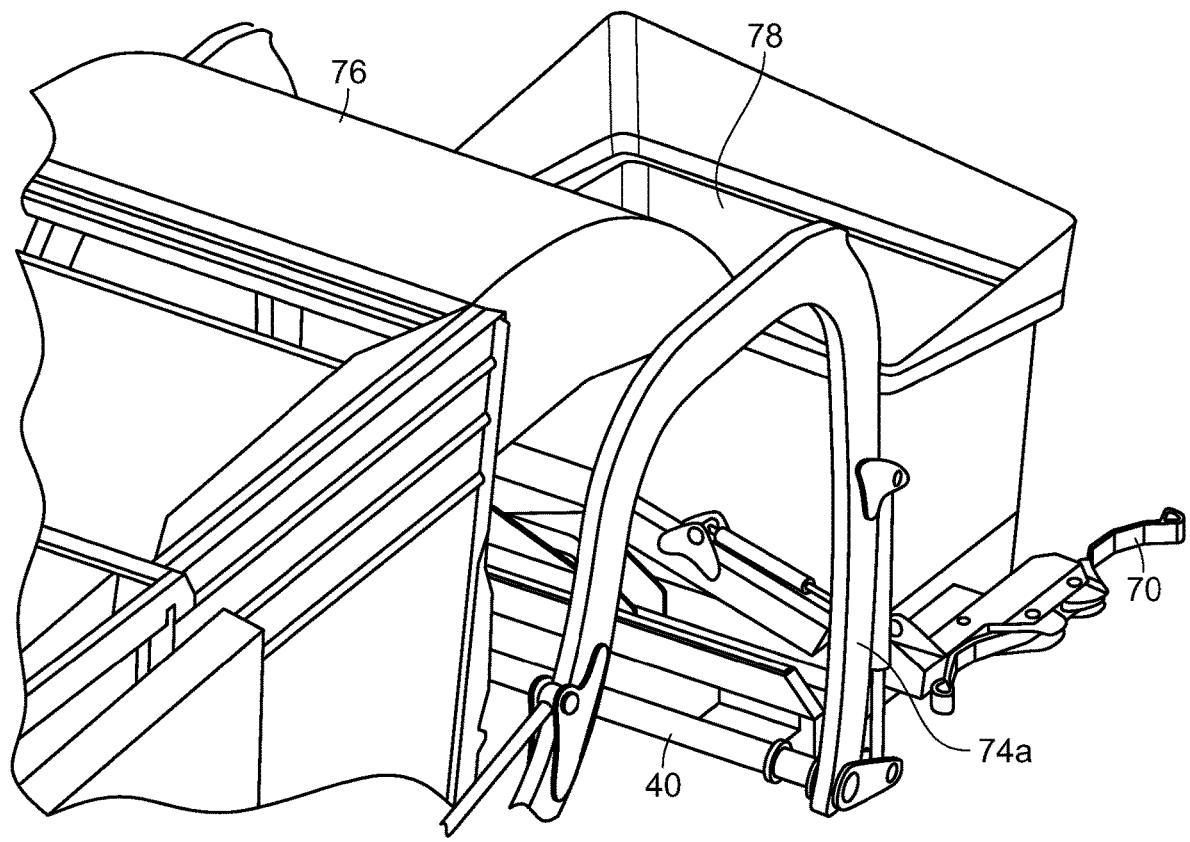
FIG. 16 is a perspective view of the side-loading robotic arm of the present invention paired with a liftable container on the forks of a front-end loader, showing the clamp mechanism in a lowered position.
Figure 17:
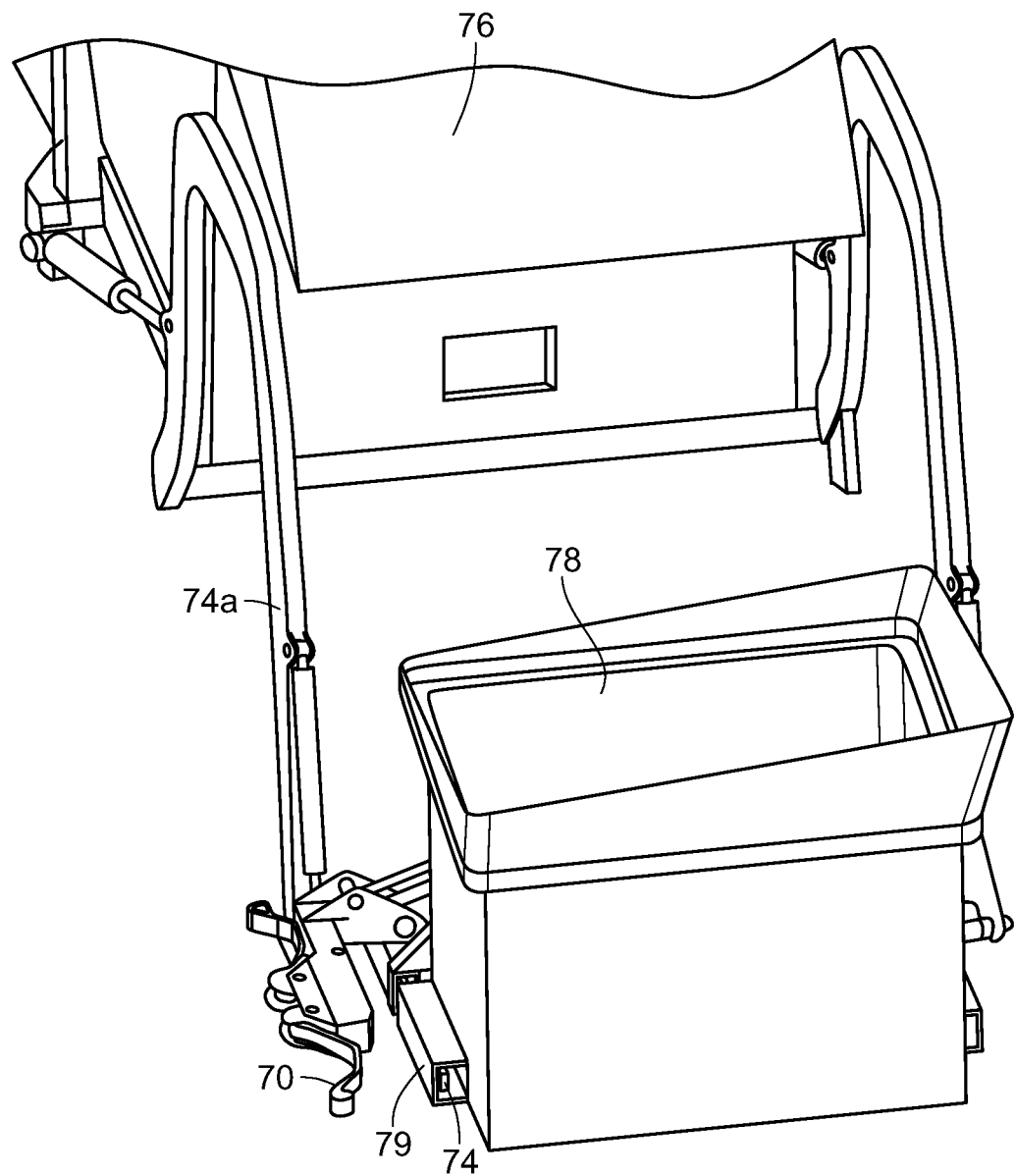
FIG. 17 is a perspective view from the opposite side of FIG. 16.
Figure 18:
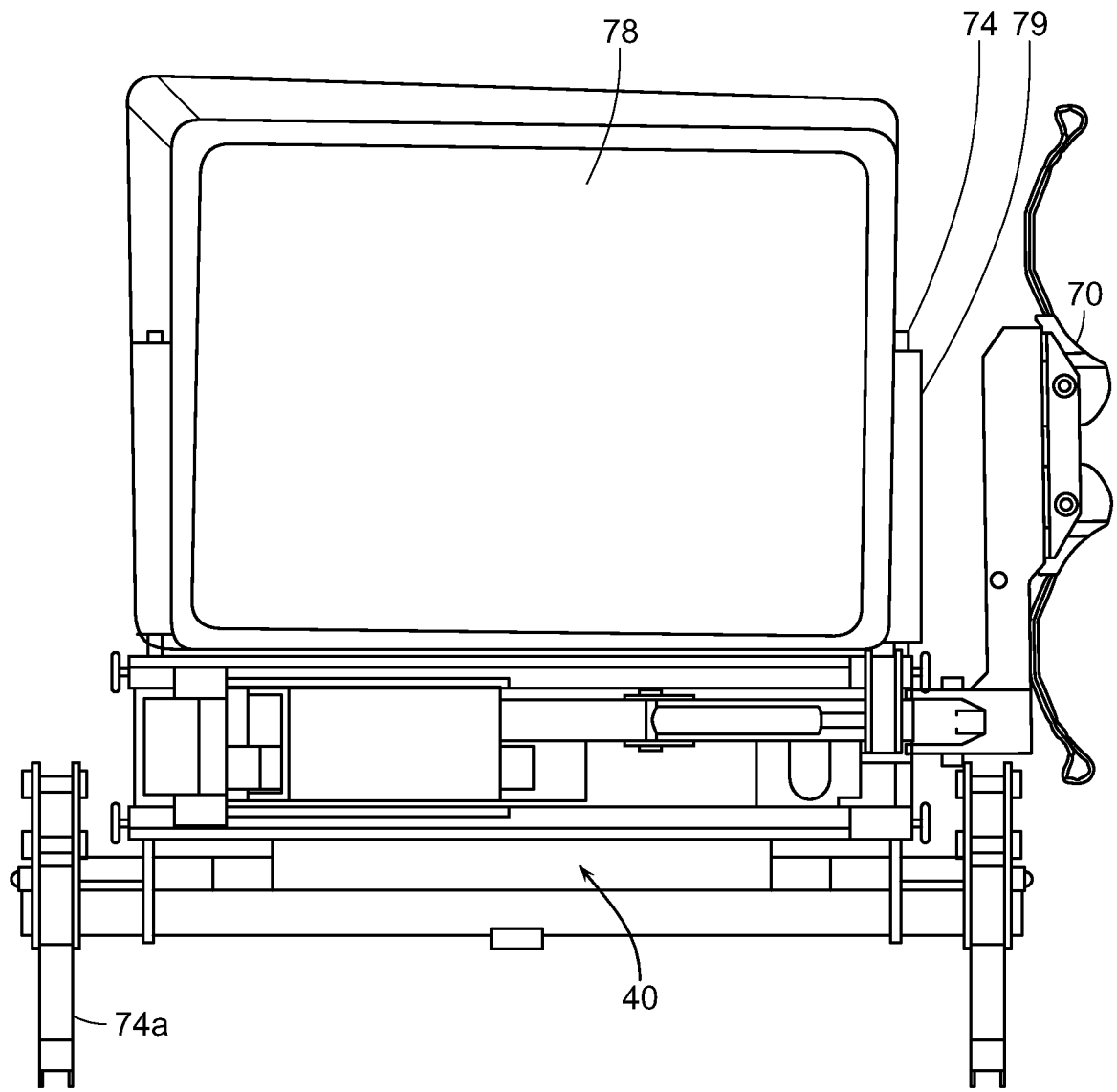
FIG. 18 is a top view of the side-loading robotic arm of the present invention paired with a liftable container on the forks of a front-end loader, showing the clamp mechanism in a lowered position.
Figure 19:
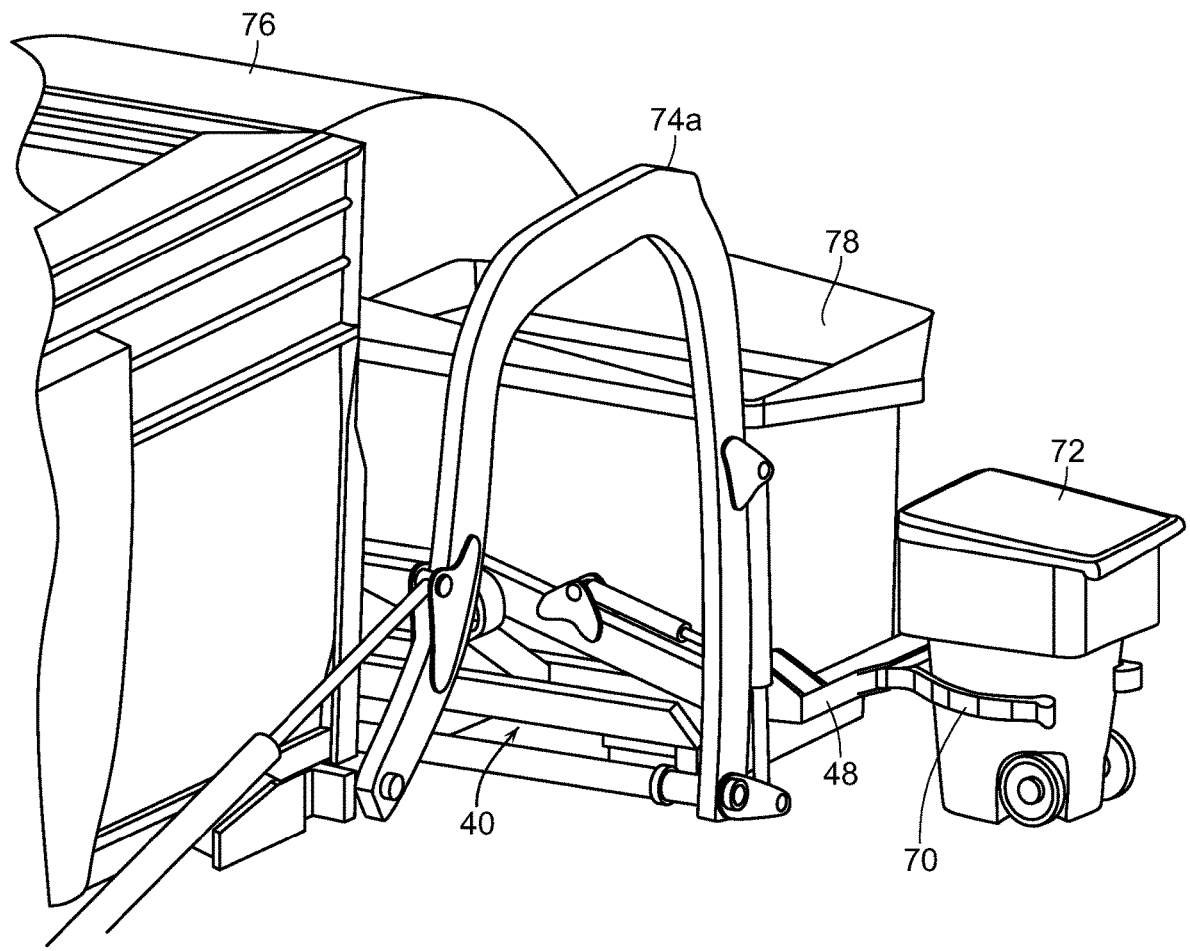
FIG. 19 is a perspective view of the side-loading robotic arm of the present invention paired with a liftable container on the forks of a front-end loader, showing the clamp mechanism in a lowered position and grasping a cart from a retracted position.
Figure 20:
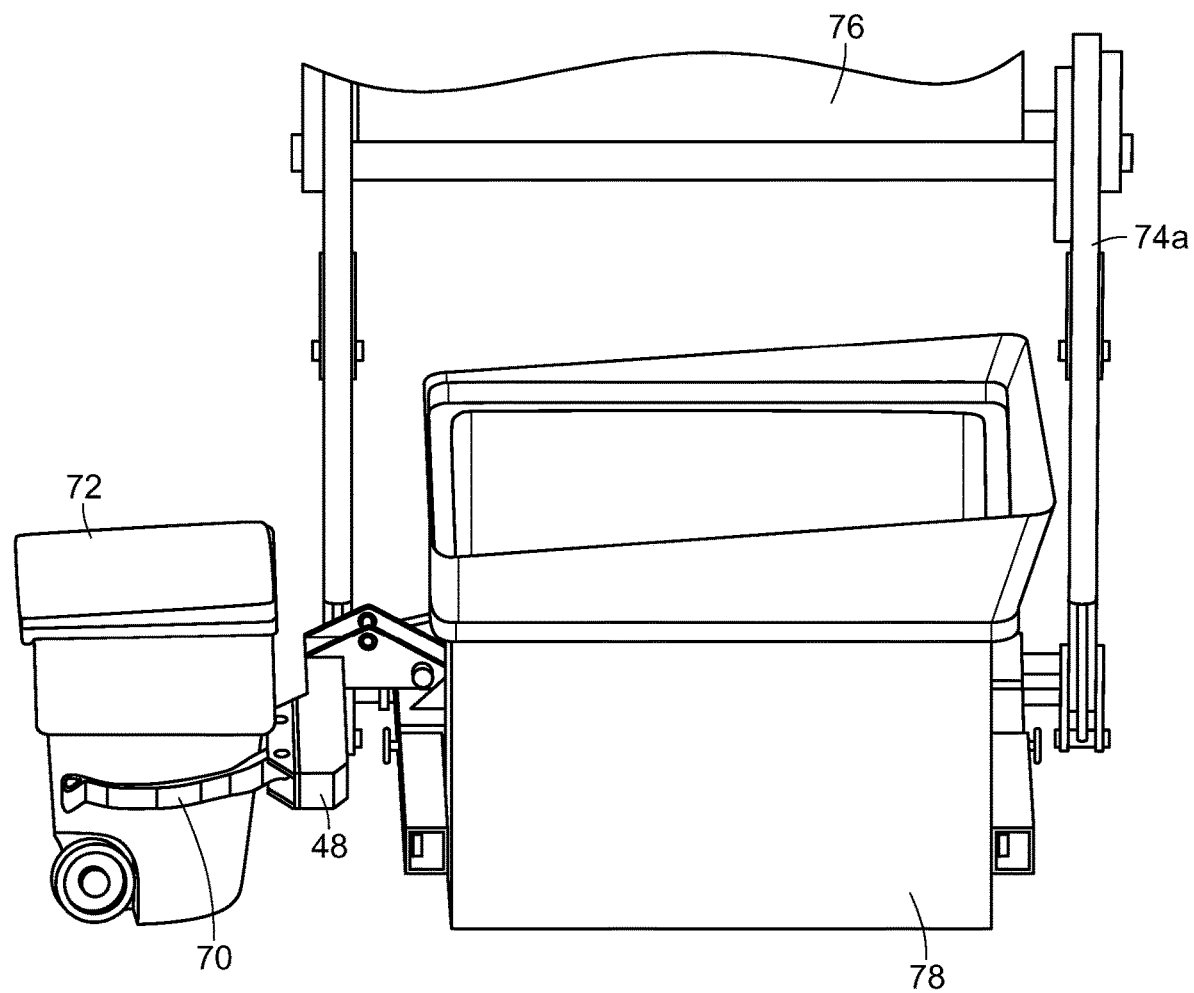
FIG. 20 is a front view of the side-loading robotic arm of the present invention paired with a liftable container on the forks of a front-end loader, showing the clamp mechanism in a lowered position and grasping a cart from a retracted position.
Figure 21:
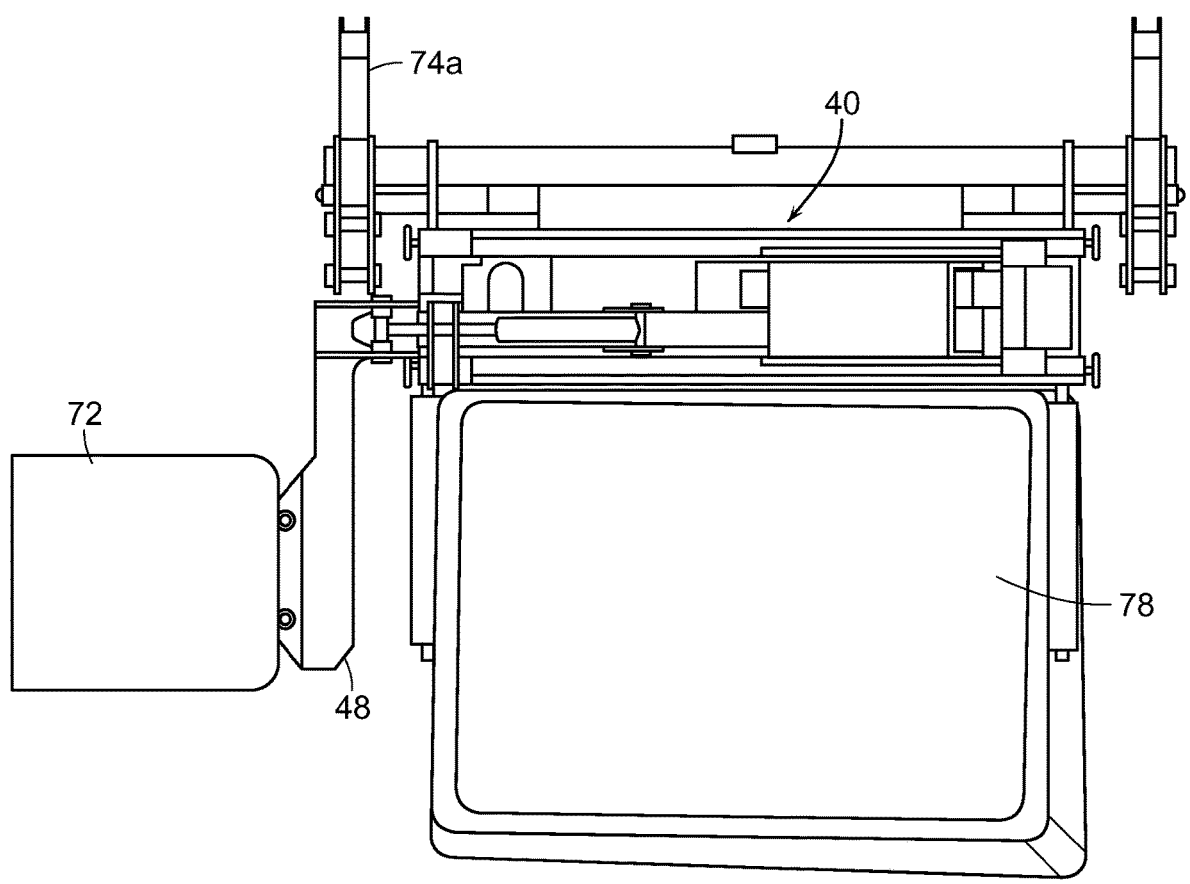
FIG. 21 is a top view of the side-loading robotic arm of the present invention paired with a liftable container on the forks of a front-end loader, showing the clamp mechanism in a lowered position and grasping a cart from a retracted position.
Figure 22:
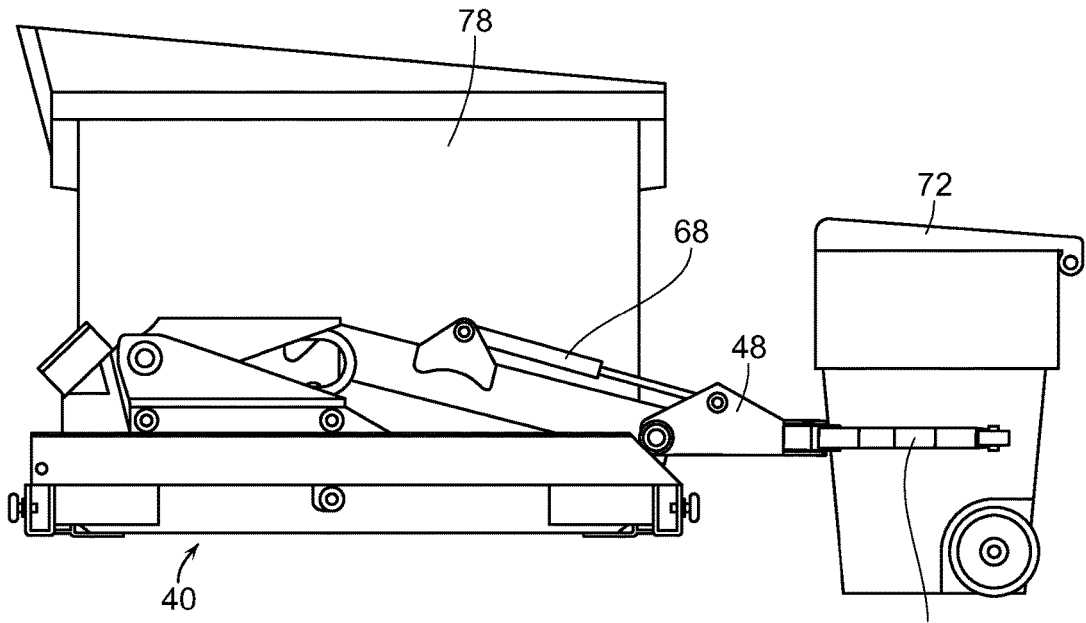
FIG. 22 is a rear view of the side-loading robotic arm of the present invention paired with a liftable container, showing the clamp mechanism in a lowered position and grasping a cart from a retracted position.

The tip arm 48 is pivotally mounted on the end of the raising arm 46 so as to be pivotably between a vertical stowed position 64 and a horizontal operational position 66. The pivoting of the tip arm 48 relative to the raising arm 46 is preferably operated by hydraulic or pneumatic controls through a tip cylinder 68 (Box A in FIG. 7). The tip arm 48 has an attachment portion 48a and an offset portion 48b that are joined in a perpendicular orientation. The tip arm 48 includes a pair of gripper arms 70 attached to an end- or mid-point of the offset portion. The gripper arms 70 are preferably switchable between open and closed positions, as by rotating gear mechanisms or similar devices, for grasping and releasing carts or other bins 72. The attachment portion 48a is attached to the end of the raising arm 46. The offset portion 48b extends perpendicularly from the attachment portion 48a such that the gripper arms 70 are offset relative to the carriage body 44, i.e., in-line with a container 78 carried by the forks 74, as described more fully below.

As shown in FIGS. 6-9, the channels 50 of the fork clamps 42 are configured to receive forks 74 as may be found on a front-end loader 76 or similar vehicle. The robotic arm 40 is mountable on the forks 74 on its own, independent of a dumpster or similar container 78. The forks 74 are preferably fully received in the channels 50 such that the robotic arm 40 is mounted as far back on the forks 74 as possible, with a major portion of the forks 74 protruding from the front of the channels 50.

A container 78 is mountable on the major portion of the forks 74 protruding from the channels 50. The forks 74 are receivable in fork receiving pockets 79 or similar structures as are commonly found on similar containers 78. While the robotic arm 40 is securely attached to the forks 74 as by the locking screws 54 on the channels 50, the pockets 79 of the container 78 are preferably freely slidable on the forks 74. This distinction between attachments to the forks 74 allows for whichever vehicle 76 to which the robotic arm 40 is attached to be selectively and easily used with any container 78 independent of the robotic arm 40. This is most clearly illustrated in FIG. 6 where the robotic arm 40 is mounted on the forks 74 without a container 78. The vehicle 76 preferably includes controller connections proximate to the forks 74, which connections are configured to connect to the base motor 43. These controller connections include electrical, hydraulic, and/or pneumatic connectors to control the various motors and cylinders as described herein.

As shown in FIGS. 7-10, when the tip arm 48 is in the vertical stow position 64, the tip arm 48 and gripper arms 70 conform closely to the side of a container 78, particularly when both the robotic arm 40 and container 78 are mounted on forks 74. As shown most clearly in FIG. 9, the tip arm 48 and gripper arms 70 are also inside the major arms 74a upon which the forks 74 are mounted. This configuration allows clearance for the major arms 74a to raise the robotic arm 40 and container 78 as a unit to empty the contents into the vehicle 78. The vertical stow position 64 uses less lateral space and allows for the robotic arm 40 to be used with wider containers 78, including standard commercial containers without the need to remove the robotic arm 40 from the forks 74.

As shown in FIGS. 11-18, the movement of the tip arm 48 and gripper arms 70 from the stowed position 64 to the operational position 66 orients the gripper arms 70 to the right side of the container 78 and extends the gripper arms 70 beyond the vertical plane of the major arms 74a. In this operational position 66, the tip arm 48 and gripper arms 70 prevent lifting of the robotic arm 40 and container 78 by the major arms 74a. Lowering the tip arm 48 to the operational position 66 also increases the initial reach of the gripper arms 70 beyond the end of the raising arm 46 and outside the vertical plane of the major arms 74a.

The increase in initial reach will generally correspond to the length of an attachment portion 48a of the tip arm 48. The attachment portion 48a extends from the end of the raising arm 46 to an operational vertical plane along the right-side of the vehicle 76, which effectively shortens the travel distance of the carriage body 44 required for the robotic arm 40 to retrieve carts 72 at or past standard distances.

Prior art robotic arms lacking a structure similar to a tip arm to switch between a vertical stowed position and a horizontal operational position require a greater range of lateral movement of a carriage body to achieve similar range of operation. However, because of the limited space between major arms on a front-end loader, there is limited range of lateral movement available between the major arms. Thus, the inventive tip arm 48 and the switch between vertical stowed position 64 and horizontal operating position 66 increases the operational reach of the robotic arm 40 compared to prior art devices.

From the operational vertical plane along the right-side of the vehicle 76, the gripper arms 70 are capable of grasping a cart 72 without any or very little lateral movement of the carriage body 44 along the rails 52. The requirement for shorter travel of the carriage body 44 means that the robotic arm 40 can operate between the major arms 74a allowing for a wider, more stable reach mechanism inherent in the robotic arm 40. Similarly, at full lateral movement of the carriage body 44 along the rails 52, the gripper arms 70 are capable of grasping a cart 72 beyond the standard reach of prior art robotic arms, equal to the length of the attachment portion 48a.

FIGS. 19-22 illustrate the gripper arms 70 engaging a cart 72 from a fully retracted position of the carriage body 44 relative to the lateral rails 52. As shown, the gripper arms 70 are capable of grasping a cart 72 from a fully retracted position, while the cart 72 is still outside of the vertical plane along the right-side of the vehicle 76. Being outside of the vertical plane along the right-side of the vehicle 76 means that the cart 72 has clearance along the entire length of the vehicle 76. The extra reach of the gripper arms 70 available in the operational position 66 of the tip arm 48 allows a user grip and dump carts 72 without the need to use the reach mechanism of the carriage body 44.

Figure 24:
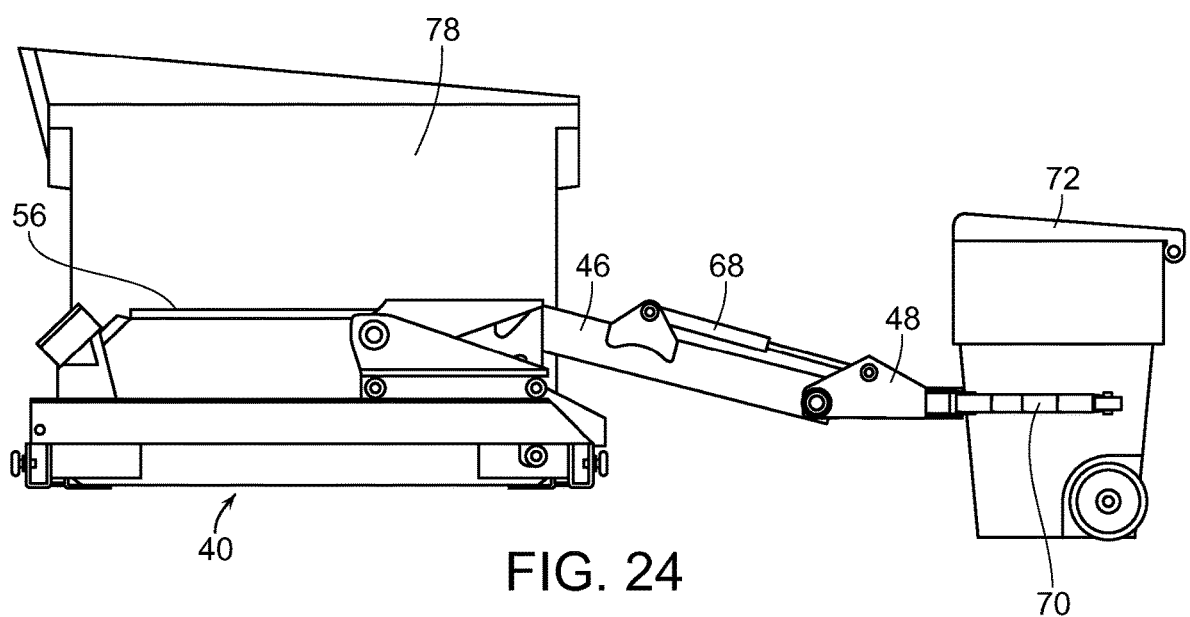
FIG. 24 is a rear view of the side-loading robotic arm of the present invention paired with a liftable container, showing the clamp mechanism in a lowered position and grasping a cart from an extended position.
Figure 23:
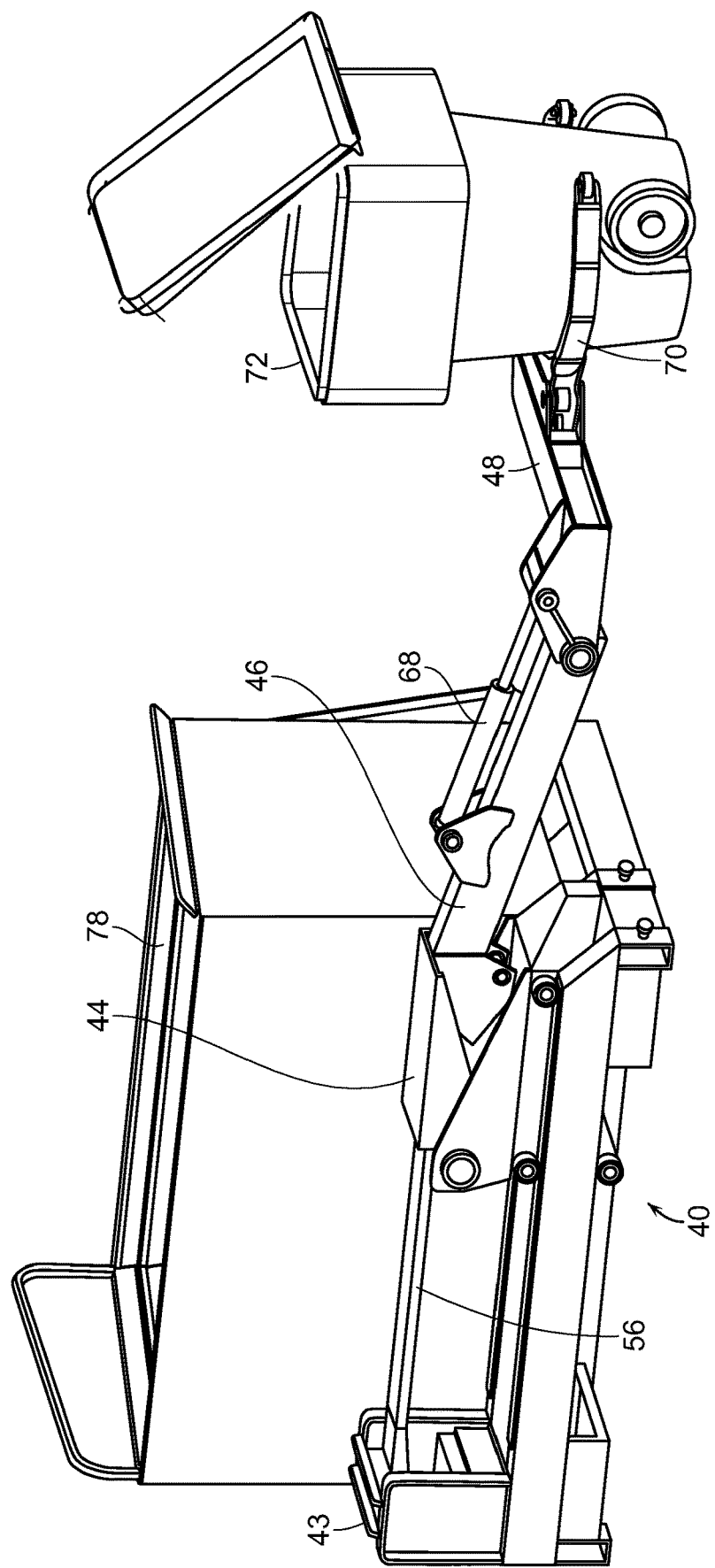
FIG. 23 is a perspective view of the side-loading robotic arm of the present invention paired with a liftable container, showing the clamp mechanism in a lowered position and grasping a cart from an extended position.

FIGS. 23-24 show the gripper arms 70 grasping a cart 72 from a fully extended position of the carriage body 44 relative to the lateral rails 52. In this fully extended position, the gripper arms 70 can grasp carts 72 well beyond the standard distance of prior art robotic arms, by as much as the length of the attachment portion 48a of the tip arm 48. Although not illustrated, the robotic arm 40 can grasp carts 72 at any point between the fully retracted and fully extended positions of the carriage body 44.

FIGS. 25-32 illustrate the inventive robotic arm 40 dumping a cart 72 into a container 78. As can be seen, the dumping operation involves the robotic arm 40 pivoting the raising arm 46 upward relative to the lateral rails 50 and simultaneously pivoting the tip arm upward into the vertical position. This combined pivoting of the raising arm 46 and tip arm 48 results in the cart 72 being inverted at a point over the container 78, generally in line with the carriage body 44.

Figure 26:
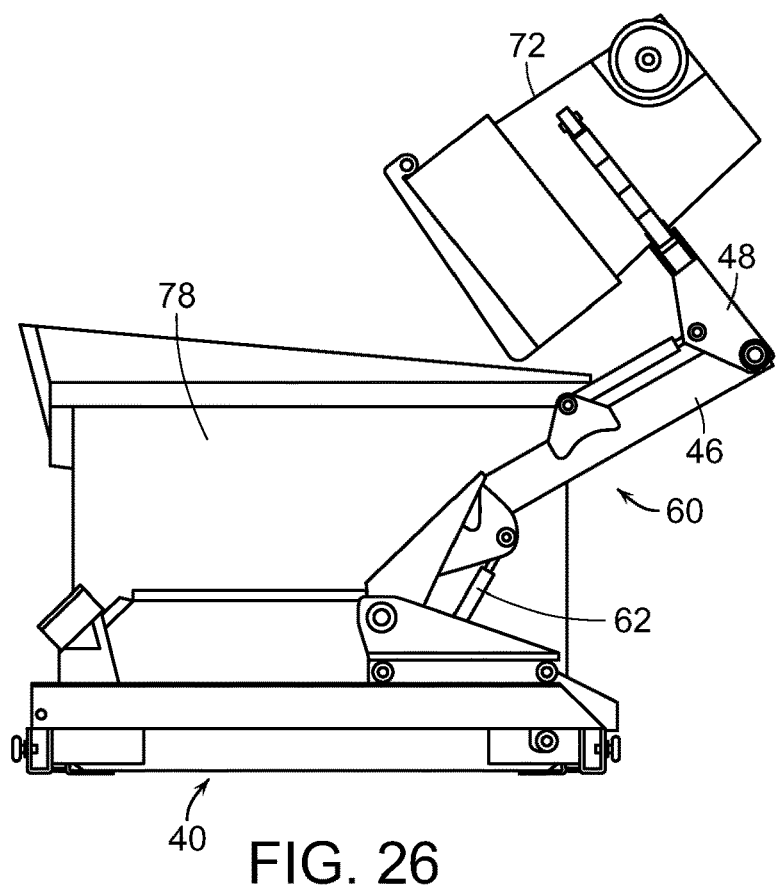
FIG. 26 is rear view of the side-loading robotic arm of the present invention paired with a liftable container, showing the robotic arm dumping a cart in the liftable container from an extended position.
Figure 27:
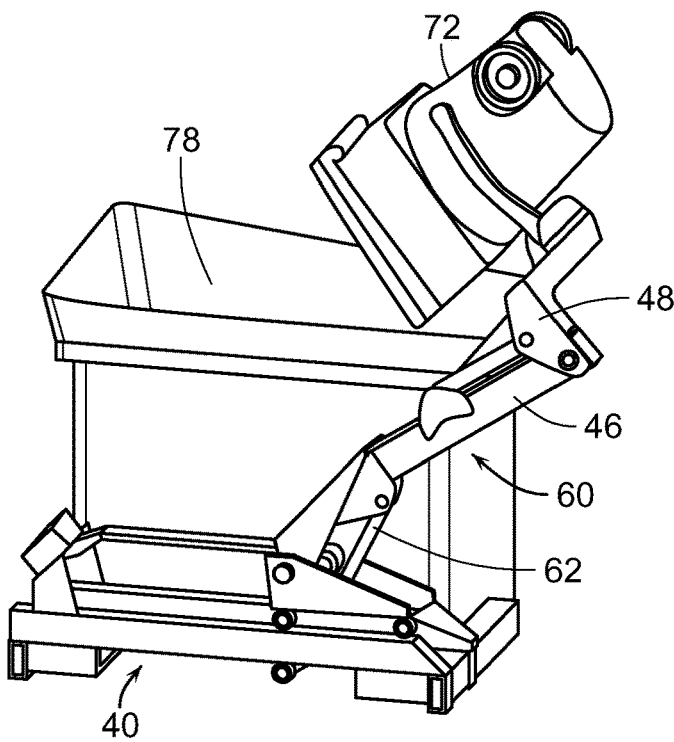
FIG. 27 is a perspective view of the side-loading robotic arm of the present invention paired with a liftable container, showing the robotic arm dumping a cart in the liftable container from an extended position.
Figure 28:
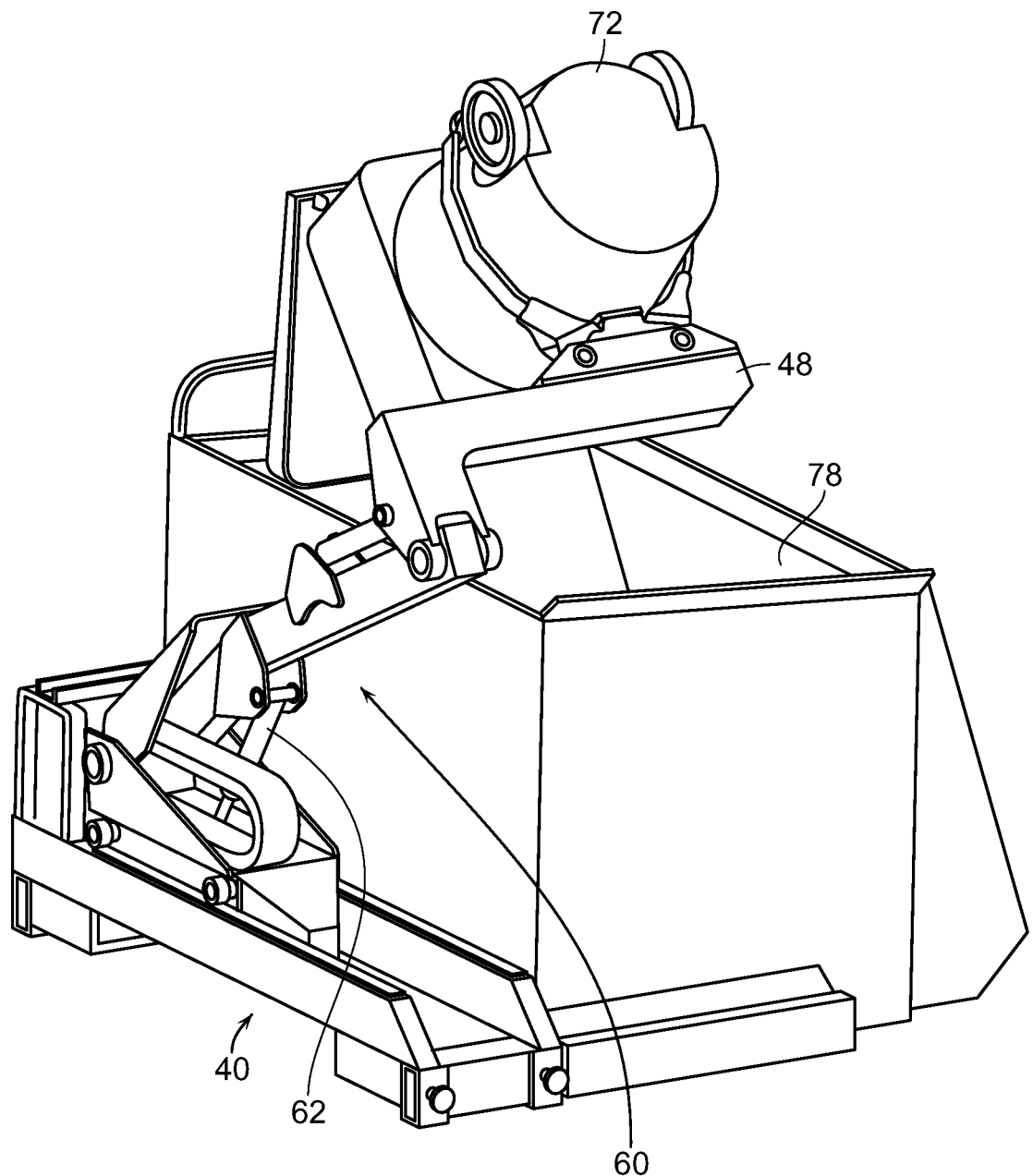
FIG. 28 is a perspective view of the side-loading robotic arm of the present invention paired with a liftable container, showing the robotic arm dumping a cart in the liftable container from a retracted position.
Figure 29:
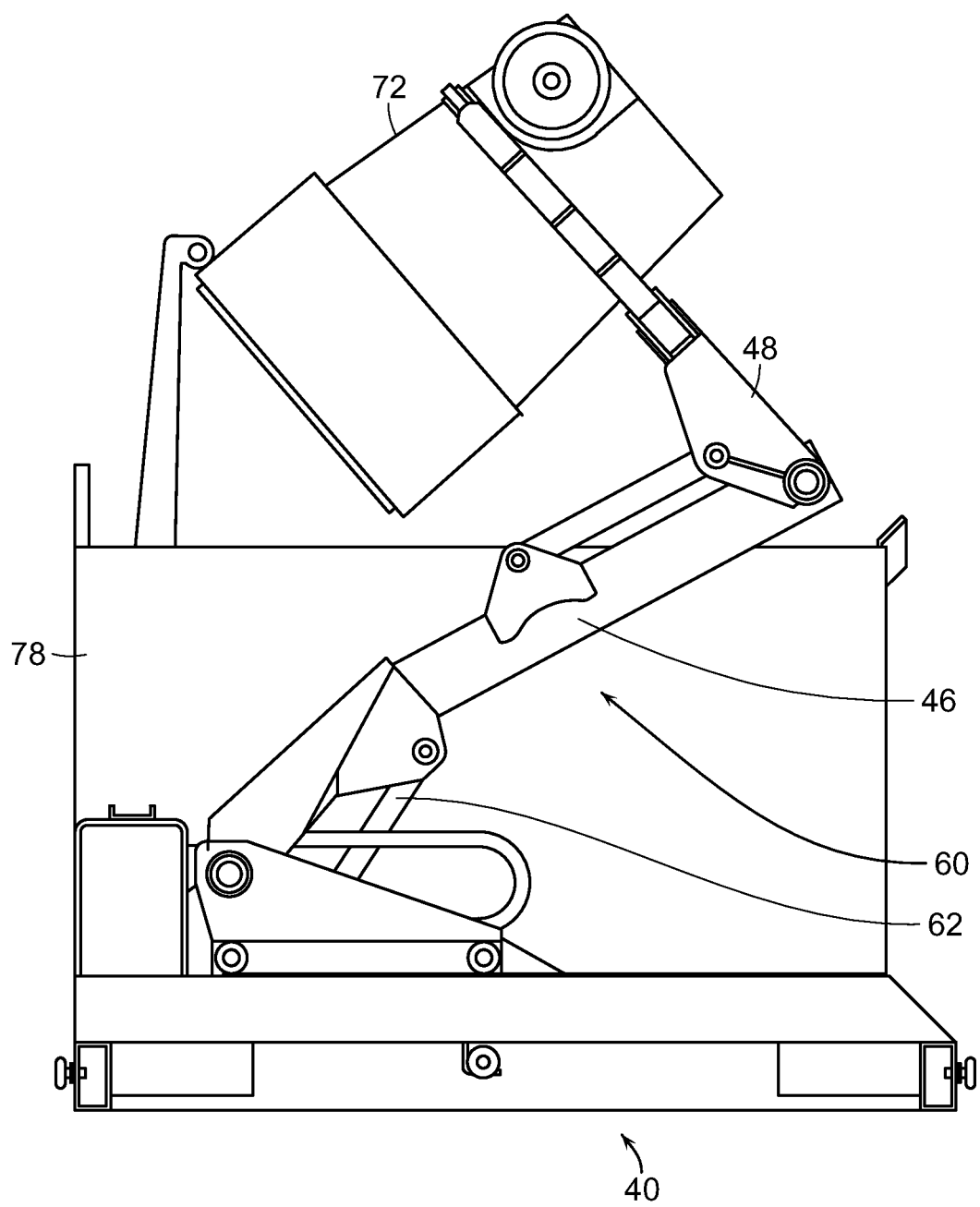
FIG. 29 is rear view of the side-loading robotic arm of the present invention paired with a liftable container, showing the robotic arm dumping a cart in the liftable container from a retracted position.
Figure 30:
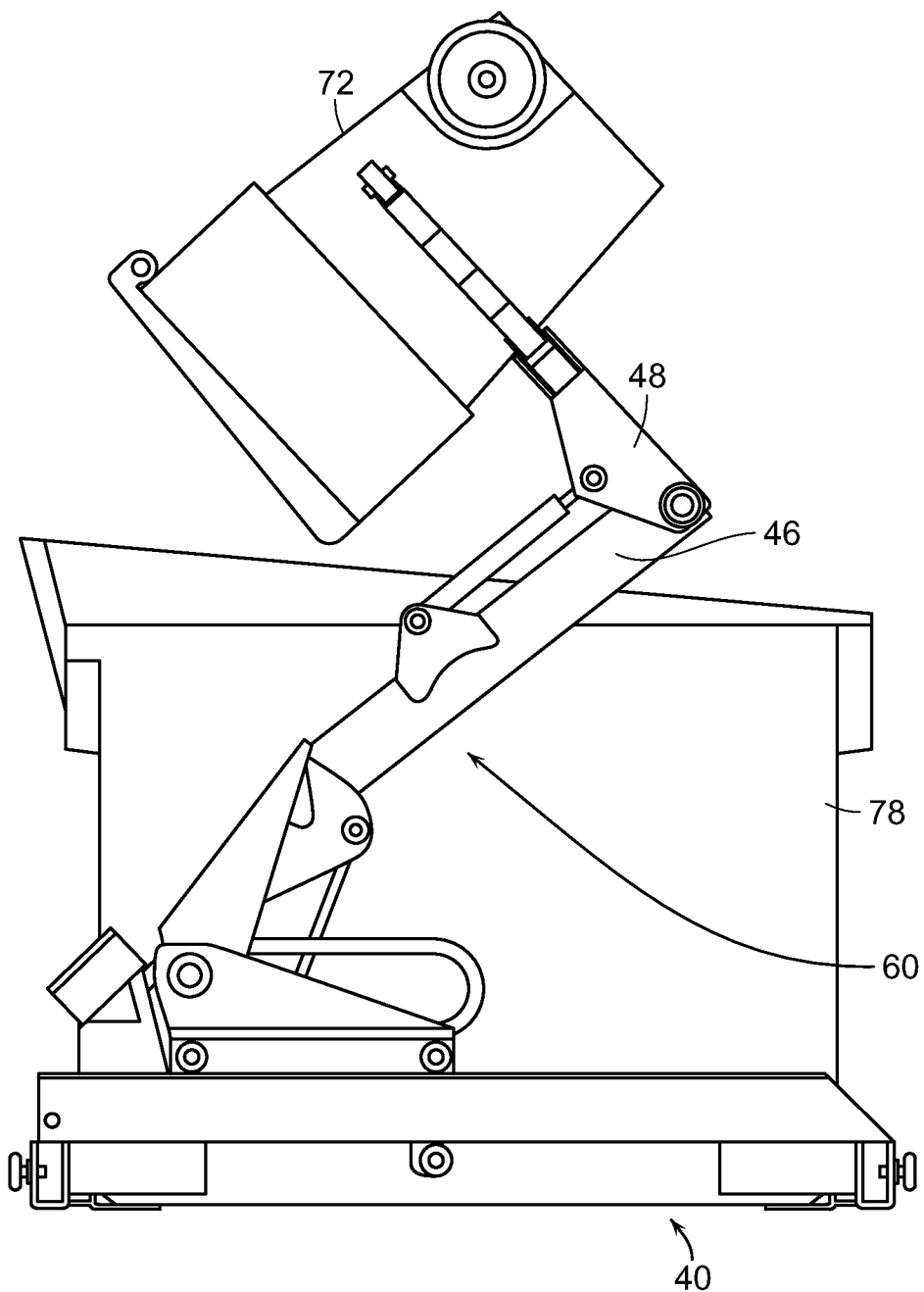
FIG. 30 is a rear view of the side-loading robotic arm of the present invention paired with a liftable container, showing the robotic arm dumping a cart in the liftable container from a retracted position.
Figure 31:
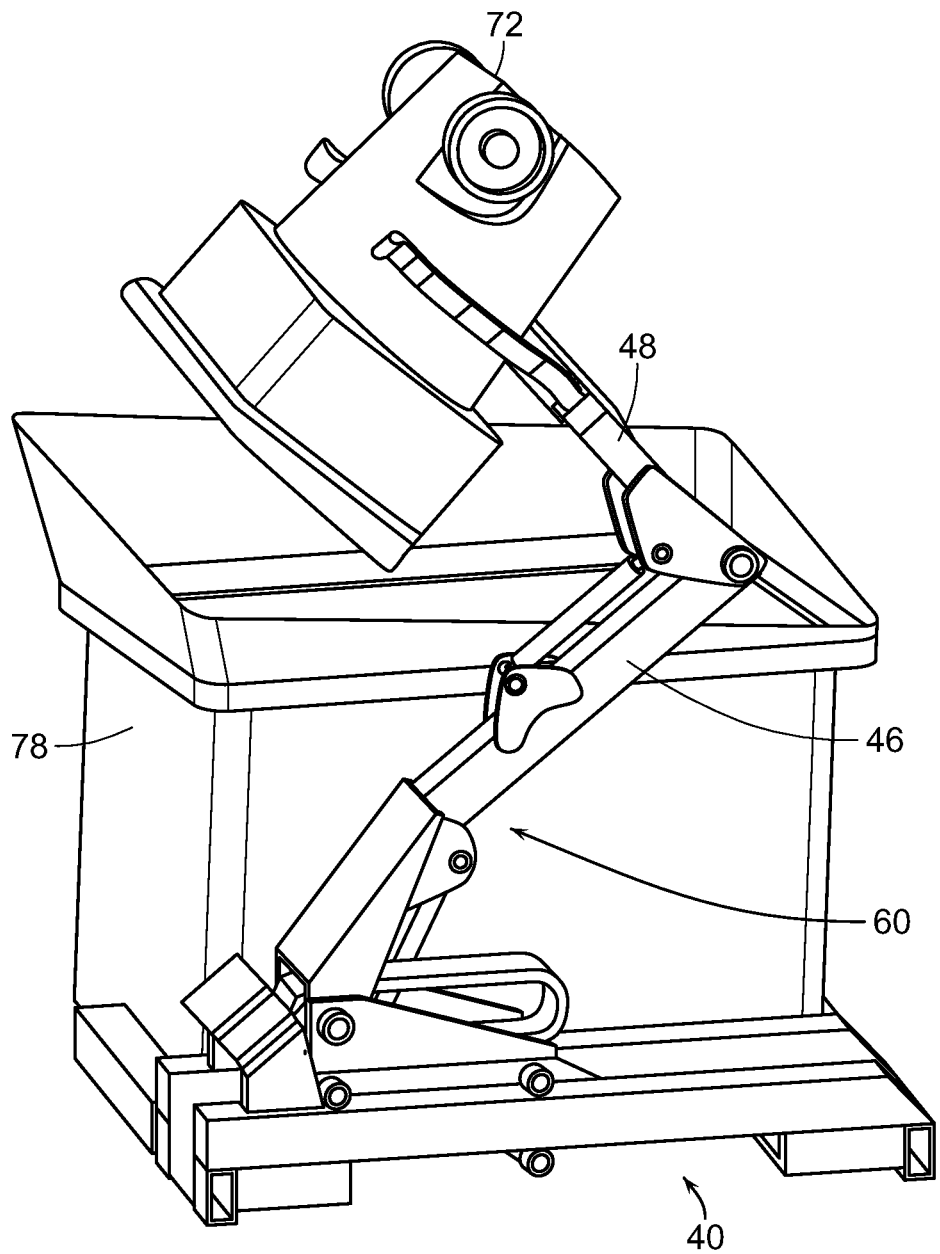
FIG. 31 is a perspective view of the side-loading robotic arm of the present invention paired with a liftable container, showing the robotic arm dumping a cart in the liftable container from a retracted position.
Figure 32:
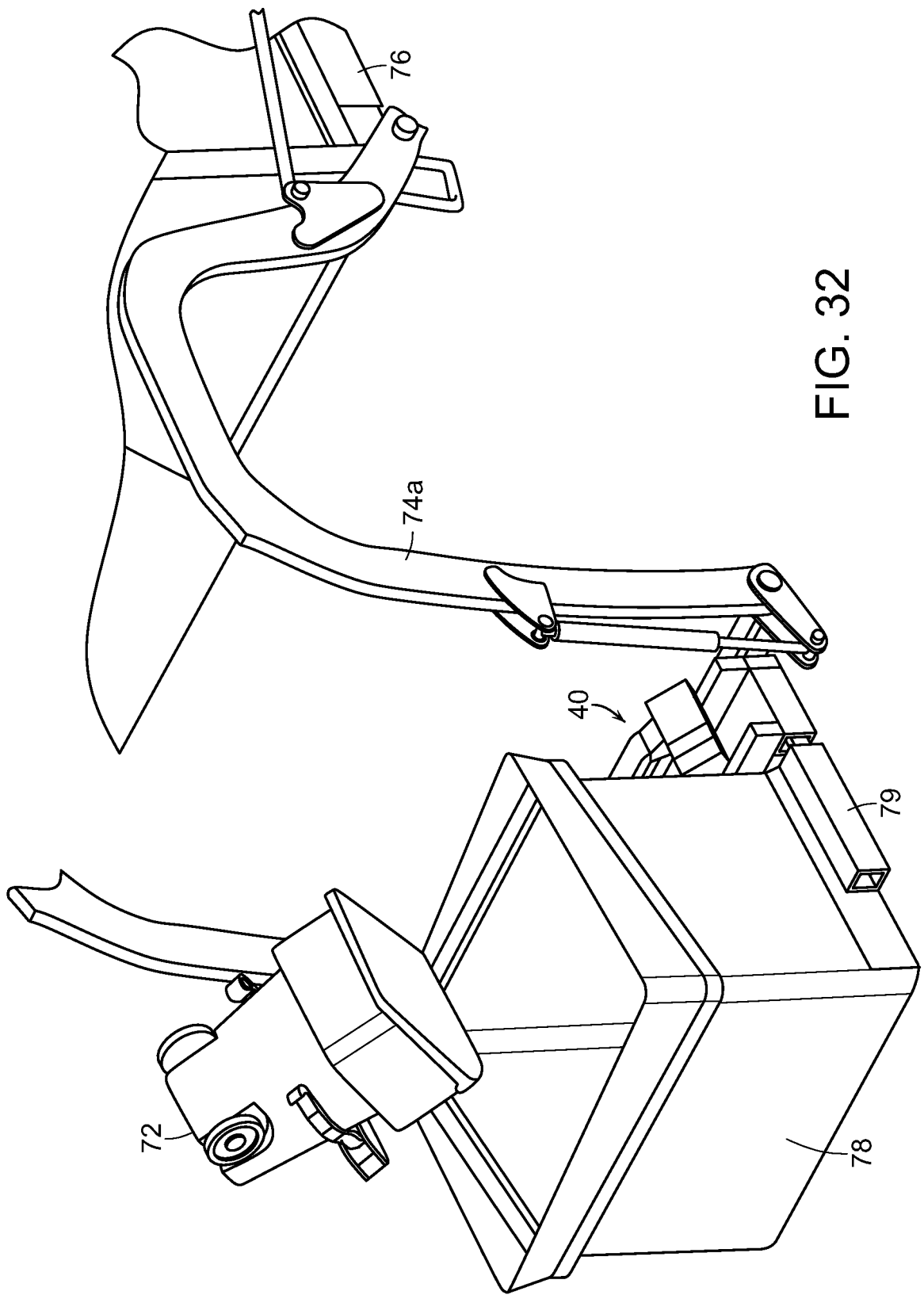
FIG. 32 is a perspective view of the side-loading robotic arm of the present invention paired with a liftable container on the forks of a front-end loader, showing the robotic arm dumping a cart in the liftable container from a retracted position.

In particular, FIGS. 25-27 illustrate such dumping operation from the fully extended position of the carriage body 44. When the cart 72 is inverted with the carriage body 44 in the fully extended position, the contents of the cart 72 are dumped into the container in line with the carriage body 44, i.e., at a point proximate or adjacent to the right-wall of the container 78. Prior art robotic arms lacking in a tip arm 48 would need to retract the carriage body from the fully extended position before inverting the cart 72 or risk dumping the contents of the cart onto the street.

FIGS. 28-32 illustrate the dumping operation from the fully retracted position of the carriage body 44. Even from this fully retracted position, the robotic arm 40 is capable of dumping the contents of the cart 72 into the container 78 without any lateral movement of the carriage body 44. As shown, the cart 72 is again inverted over the container 78 at a point in-line with the carriage body 44, i.e., proximate or adjacent to the left-wall of the container 78. Because the combination of the raising arm 46 and tip arm 48 cause the cart 72 to be dumped at a point in-line with the carriage body 44 it is impossible for a user to miss the container 78 during a dumping operation without the need for location switches or other position sensors as are found in the prior art.

The robotic arm 40 described herein has a number of particular features that should preferably be employed in combination, although each is useful separately without departure from the scope and spirit of the invention. Although a preferred embodiment has been described in detail for purposes of illustration, various modifications may be made without departing from the scope and spirit of the invention. Accordingly, the invention is not to be limited, except as by the appended claims.

What is claimed is:

1. A side-loading robotic arm, comprising:
    a carriage body reciprocatingly disposed in a lateral plane relative to a liftable container;
    a raising arm attached at one end to the carriage body and pivotable between a lowered position and a raised position in a vertical plane relative to the carriage body;
    a tip arm pivotingly attached to the raising arm opposite the carriage body; and
    a pair of gripper arms fixedly attached to and co-planar with the tip arm, wherein the tip arm and pair of gripper arms are pivotable between a vertical stowed position and a horizontal operational position relative to a sidewall of the liftable container, when the raising arm is in the lowered position.

2. The robotic arm of claim 1, further comprising a lift cylinder operationally connected at one end to the carriage body and at an opposite end to the raising arm.

3. The robotic arm of claim 1, further comprising a tip cylinder operationally connected at one end to the tip arm and at an opposite end to the raising arm.

4. The robotic arm of claim 1, wherein the tip arm comprises an attachment portion and an offset portion, each perpendicularly connected to the other.

5. The robotic arm of claim 4, wherein the attachment portion conforms the tip arm and the pair of gripper arms within a plane of the sidewall of the liftable container when in the vertical stowed position.

6. The robotic arm of claim 4, wherein the attachment portion extends the pair of gripper arms away from the sidewall of the liftable container when the tip arm is in the horizontal operational position.

7. The robotic arm of claim 4, wherein the offset portion is connected at one end to the attachment portion, and the gripper arms are attached to the offset portion at a mid-point or an opposite end relative to the attachment portion.

8. A side-loading robotic arm, comprising:
    a carriage body reciprocatingly disposed in a lateral plane relative to a liftable container;
    a raising arm attached at one end to the carriage body and pivotable between a lowered position and a raised position in a vertical plane relative to the carriage body;
    a tip arm pivotingly attached to the raising arm opposite the carriage body and a tip cylinder operationally connected at one end to the tip arm and at an opposite end to the raising arm; and
    a pair of gripper arms fixedly attached to and co-planar with the tip arm, wherein the tip cylinder is configured to pivot the tip arm and the pair of gripper arms between a vertical stowed position and a horizontal operational position relative to a sidewall of the liftable container, when the raising arm is in the lowered position.

9. The robotic arm of claim 8, further comprising a lift cylinder operationally connected at one end to the carriage body and at an opposite end to the raising arm.

10. The robotic arm of claim 8, wherein the tip arm comprises an attachment portion and an offset portion, each perpendicularly connected to the other.

11. The robotic arm of claim 10, wherein the attachment portion conforms the tip arm and the pair of gripper arms within a plane of the sidewall of the liftable container when in the vertical stowed position.

12. The robotic arm of claim 10, wherein the attachment portion extends the pair of gripper arms away from the sidewall of the liftable container when the tip arm is in the horizontal operational position.

13. The robotic arm of claim 10, wherein the offset portion is connected at one end to the attachment portion, and the gripper arms are attached to the offset portion at a mid-point or an opposite end relative to the attachment portion.

14. A side-loading robotic arm, comprising:
    a carriage body reciprocatingly disposed in a lateral plane relative to a liftable container;
    a raising arm attached at one end to the carriage body and pivotable between a lowered position and a raised position in a vertical plane relative to the carriage body;
    a tip arm having an attachment portion perpendicularly connected to an offset portion, wherein the attachment portion is pivotingly attached to the raising arm opposite the carriage body; and
    a pair of gripper arms fixedly attached to and co-planar with the offset portion of the tip arm, wherein the tip arm and the pair of gripper arms are pivotable between a vertical stowed position and a horizontal operational position relative to a sidewall of the liftable container, when the raising arm is in the lowered position.

15. The robotic arm of claim 14, further comprising a lift cylinder operationally connected at one end to the carriage body and at an opposite end to the raising arm.

16. The robotic arm of claim 14, further comprising a tip cylinder operationally connected at one end to the attachment portion of the tip arm and at an opposite end to the raising arm.

17. The robotic arm of claim 14, wherein the attachment portion conforms the tip arm and the pair of gripper arms within a plane of the sidewall of the liftable container when in the vertical stowed position.

18. The robotic arm of claim 14, wherein the attachment portion extends the pair of gripper arms away from the sidewall of the liftable container when the tip arm is in the horizontal operational position.

19. The robotic arm of claim 14, wherein the offset portion is connected at one end to the attachment portion, and the gripper arms are attached to the offset portion at a mid-point or an opposite end relative to the attachment portion.

\* \* \* \* \*